(12) United States Patent
Allshouse et al.

(10) Patent No.: US 10,848,382 B1
(45) Date of Patent: Nov. 24, 2020

(54) SYSTEMS AND METHODS FOR NETWORK ASSET DISCOVERY AND ASSOCIATION THEREOF WITH ENTITIES

(71) Applicant: BitSight Technologies, Inc., Boston, MA (US)

(72) Inventors: Austin Allshouse, Raleigh, NC (US); Daniel Dahlberg, Somerville, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 16/583,991

(22) Filed: Sep. 26, 2019

(51) Int. Cl.
*H04L 12/24* (2006.01)
*H04W 40/24* (2009.01)
*H04L 12/26* (2006.01)
*H04L 29/08* (2006.01)

(52) U.S. Cl.
CPC ......... *H04L 41/0853* (2013.01); *H04L 41/12* (2013.01); *H04L 43/0876* (2013.01); *H04L 67/22* (2013.01); *H04W 40/24* (2013.01)

(58) Field of Classification Search
CPC ....... H04L 43/0876; H04L 67/22; H04W 4/04
See application file for complete search history.

(56) References Cited

U.S. PATENT DOCUMENTS

| | | | |
|---|---|---|---|
| 7,062,572 B1 * | 6/2006 | Hampton | .......... H04L 29/12009 709/217 |
| D525,264 S | 7/2006 | Chotai | |
| D525,629 S | 7/2006 | Chotai | |
| D604,740 S | 11/2009 | Matheny | |
| 7,650,570 B2 | 1/2010 | Torrens | |
| 7,747,778 B1 | 6/2010 | King | |
| 7,827,607 B2 | 11/2010 | Sobel et al. | |
| D630,645 S | 1/2011 | Tokunaga | |
| 8,000,698 B2 * | 8/2011 | Wolman | ............ H04W 12/1202 455/423 |
| D652,048 S | 1/2012 | Joseph | |
| D667,022 S | 9/2012 | LoBosco | |
| 8,370,933 B1 | 2/2013 | Buckler | |
| D682,287 S | 5/2013 | Cong | |
| D688,260 S | 8/2013 | Pearcy | |

(Continued)

FOREIGN PATENT DOCUMENTS

| WO | WO-2017/142694 A1 | 8/2017 |
|---|---|---|
| WO | WO-2019/023045 A1 | 1/2019 |

OTHER PUBLICATIONS

Maxim Chaernysher et al, :On 802.11 Access Point Locatability and Named Entity Recognition in Service Set Identifiers. (Year: 2016).*

(Continued)

*Primary Examiner* — Lashonda T Jacobs
(74) *Attorney, Agent, or Firm* — Goodwin Procter LLP

(57) ABSTRACT

A system for discovering digital assets and determining an association between the assets and an entity analyzes publicly available information about entities of interest and dataset(s) generated via network observations from devices using the digital assets. Additional attributes included in the network observations dataset(s) and metadata from such observations may be used to enhance the correctness of the identified entity-asset associations. Network observations dataset(s) may be monitored on an on-going basis to provide current entity-asset associations.

24 Claims, 18 Drawing Sheets

(56) References Cited

U.S. PATENT DOCUMENTS

| | | |
|---|---|---|
| D691,164 S | 10/2013 | Lim |
| D694,252 S | 11/2013 | Helm |
| D694,253 S | 11/2013 | Helm |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,825,662 B1 | 9/2014 | Kingman et al. |
| D730,918 S | 6/2015 | Park |
| 9,053,210 B2 | 6/2015 | Elnikety |
| 9,075,990 B1 | 7/2015 | Yang |
| D740,847 S | 10/2015 | Yampolskiy et al. |
| D740,848 S | 10/2015 | Bolts |
| D741,351 S | 10/2015 | Kito |
| D746,832 S | 1/2016 | Pearcy |
| 9,241,252 B2 * | 1/2016 | Dua ................... H04W 8/005 |
| 9,244,899 B1 | 1/2016 | Greenbaum |
| 9,294,498 B1 | 3/2016 | Yampolskiy et al. |
| D754,690 S | 4/2016 | Park |
| D754,696 S | 4/2016 | Follett |
| D756,371 S | 5/2016 | Bertnick |
| D756,372 S | 5/2016 | Bertnick |
| D756,392 S | 5/2016 | Yun |
| D759,084 S | 6/2016 | Yampolskiy et al. |
| D759,689 S | 6/2016 | Olson |
| 9,372,994 B1 | 6/2016 | Yampolskiy et al. |
| D760,782 S | 7/2016 | Kendler |
| 9,384,206 B1 | 7/2016 | Bono et al. |
| 9,401,926 B1 | 7/2016 | Dubow et al. |
| 9,407,658 B1 | 8/2016 | Kuskov et al. |
| 9,424,333 B1 | 8/2016 | Bisignani |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo |
| D775,635 S | 1/2017 | Raji |
| D776,136 S | 1/2017 | Chen |
| D776,153 S | 1/2017 | Yampolskiy et al. |
| D777,177 S | 1/2017 | Chen |
| 9,560,072 B1 | 1/2017 | Xu |
| D778,927 S | 2/2017 | Bertnick |
| D778,928 S | 2/2017 | Bertnick |
| D779,512 S | 2/2017 | Kimura |
| D779,514 S | 2/2017 | Baris |
| D779,531 S | 2/2017 | List |
| D780,770 S | 3/2017 | Sum |
| D785,009 S | 4/2017 | Lim |
| D785,010 S | 4/2017 | Bachman |
| D785,016 S | 4/2017 | Berwick |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne |
| D789,947 S | 6/2017 | Sun |
| D789,957 S | 6/2017 | Wu |
| D791,153 S | 7/2017 | Rice |
| D791,834 S | 7/2017 | Eze |
| D792,427 S | 7/2017 | Weaver |
| D795,891 S | 8/2017 | Kohan |
| D796,523 S | 9/2017 | Bhandari |
| D801,989 S | 11/2017 | Iketsuki |
| D803,237 S | 11/2017 | Wu |
| D804,528 S | 12/2017 | Martin |
| D806,735 S | 1/2018 | Olsen |
| D806,737 S | 1/2018 | Chung |
| D809,523 S | 2/2018 | Lipka |
| D812,633 S | 3/2018 | Saneii |
| D814,483 S | 4/2018 | Gavaskar |
| D815,119 S | 4/2018 | Chalker |
| D815,148 S | 4/2018 | Martin |
| D816,105 S | 4/2018 | Rudick |
| D816,116 S | 4/2018 | Selassie |
| 9,954,893 B1 | 4/2018 | Zhao et al. |
| D817,970 S | 5/2018 | Chang |
| D817,977 S | 5/2018 | Kato |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| 10,185,924 B1 | 1/2019 | McClintock et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |
| 10,257,219 B1 | 4/2019 | Geil et al. |
| 10,305,854 B2 * | 5/2019 | Alizadeh-Shabdiz .................... H04L 67/30 |
| 10,331,502 B1 | 6/2019 | Hart |
| 10,339,321 B2 | 7/2019 | Tedeschi |
| 10,339,484 B2 | 7/2019 | Pai et al. |
| 10,412,083 B2 * | 9/2019 | Zou ................... H04W 12/003 |
| 10,469,515 B2 | 11/2019 | Helmsen et al. |
| 10,491,619 B2 | 11/2019 | Yampolskiy et al. |
| 10,491,620 B2 | 11/2019 | Yampolskiy et al. |
| 10,521,583 B1 | 12/2019 | Bagulho Monteiro Pereira |
| D880,512 S | 4/2020 | Greenwald et al. |
| 2002/0133365 A1 | 9/2002 | Grey et al. |
| 2002/0164983 A1 | 11/2002 | Raviv et al. |
| 2003/0187967 A1 | 10/2003 | Walsh et al. |
| 2004/0003284 A1 | 1/2004 | Campbell et al. |
| 2004/0098375 A1 | 5/2004 | DeCarlo |
| 2004/0193907 A1 | 9/2004 | Patanella |
| 2005/0066195 A1 | 3/2005 | Jones |
| 2005/0076245 A1 | 4/2005 | Graham et al. |
| 2005/0160002 A1 | 7/2005 | Roetter et al. |
| 2005/0278726 A1 | 12/2005 | Cano |
| 2006/0036335 A1 | 2/2006 | Banter |
| 2006/0107226 A1 | 5/2006 | Matthews |
| 2006/0253581 A1 | 11/2006 | Dixon et al. |
| 2007/0016948 A1 | 1/2007 | Dubrovsky et al. |
| 2007/0067845 A1 | 3/2007 | Wiemer et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2008/0033775 A1 | 2/2008 | Dawson et al. |
| 2008/0091834 A1 | 4/2008 | Norton |
| 2008/0140728 A1 | 6/2008 | Fraser et al. |
| 2008/0172382 A1 | 7/2008 | Prettejohn |
| 2008/0208995 A1 | 8/2008 | Takahashi et al. |
| 2008/0222287 A1 | 9/2008 | Bahl et al. |
| 2009/0125427 A1 | 5/2009 | Atwood et al. |
| 2009/0161629 A1 | 6/2009 | Purkayastha et al. |
| 2009/0216700 A1 | 8/2009 | Bouchard et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arfin |
| 2010/0186088 A1 | 7/2010 | Banerjee et al. |
| 2010/0205042 A1 | 8/2010 | Mun |
| 2010/0218256 A1 | 8/2010 | Thomas et al. |
| 2010/0275263 A1 | 10/2010 | Bennett et al. |
| 2010/0281124 A1 | 11/2010 | Westman et al. |
| 2010/0281151 A1 | 11/2010 | Ramankutty et al. |
| 2011/0137704 A1 | 6/2011 | Mitra |
| 2011/0145576 A1 | 6/2011 | Bettan |
| 2011/0213742 A1 | 9/2011 | Lemmond et al. |
| 2011/0219455 A1 | 9/2011 | Bhagwan et al. |
| 2011/0231395 A1 | 9/2011 | Vadlamani |
| 2011/0239300 A1 | 9/2011 | Klein et al. |
| 2011/0296519 A1 | 12/2011 | Ide et al. |
| 2012/0036263 A1 | 2/2012 | Madden et al. |
| 2012/0089745 A1 | 4/2012 | Turakhia |
| 2012/0174219 A1 * | 7/2012 | Hernandez ............ G06F 21/562 726/22 |
| 2012/0198558 A1 | 8/2012 | Liu et al. |
| 2012/0215892 A1 | 8/2012 | Wanser |
| 2012/0255027 A1 | 10/2012 | Kanakapura et al. |
| 2012/0291129 A1 | 11/2012 | Shulman et al. |
| 2013/0014253 A1 | 1/2013 | Vivian et al. |

(56) References Cited

U.S. PATENT DOCUMENTS

| | | | |
|---|---|---|---|
| 2013/0060351 A1 | 3/2013 | Imming et al. | |
| 2013/0080505 A1 | 3/2013 | Nielsen et al. | |
| 2013/0086521 A1 | 4/2013 | Grossele | |
| 2013/0091574 A1 | 4/2013 | Howes et al. | |
| 2013/0124644 A1 | 5/2013 | Hunt et al. | |
| 2013/0124653 A1 | 5/2013 | Vick et al. | |
| 2013/0142050 A1 | 6/2013 | Luna | |
| 2013/0173791 A1* | 7/2013 | Longo | H04L 29/12056 709/224 |
| 2013/0227078 A1 | 8/2013 | Wei et al. | |
| 2013/0291105 A1 | 10/2013 | Zheng | |
| 2013/0298244 A1 | 11/2013 | Kumar et al. | |
| 2013/0305368 A1 | 11/2013 | Ford | |
| 2013/0333038 A1 | 12/2013 | Chien | |
| 2013/0347116 A1 | 12/2013 | Flores | |
| 2014/0006129 A1 | 1/2014 | Heath | |
| 2014/0019196 A1 | 1/2014 | Wiggins | |
| 2014/0114755 A1 | 4/2014 | Mezzacca | |
| 2014/0114843 A1 | 4/2014 | Klein et al. | |
| 2014/0130158 A1 | 5/2014 | Wang et al. | |
| 2014/0146370 A1 | 5/2014 | Banner et al. | |
| 2014/0189098 A1 | 7/2014 | MaGill et al. | |
| 2014/0244317 A1 | 8/2014 | Roberts et al. | |
| 2014/0283068 A1 | 9/2014 | Call et al. | |
| 2014/0288996 A1 | 9/2014 | Rence et al. | |
| 2014/0304816 A1 | 10/2014 | Klein et al. | |
| 2014/0337633 A1* | 11/2014 | Yang | H04L 9/3297 713/178 |
| 2015/0033331 A1 | 1/2015 | Stern et al. | |
| 2015/0033341 A1 | 1/2015 | Schmidtler et al. | |
| 2015/0074579 A1* | 3/2015 | Gladstone | G06Q 50/01 715/771 |
| 2015/0081860 A1* | 3/2015 | Kuehnel | G06Q 30/0254 709/222 |
| 2015/0156084 A1 | 6/2015 | Kaminsky et al. | |
| 2015/0180883 A1 | 6/2015 | Aktas et al. | |
| 2015/0261955 A1 | 9/2015 | Huang et al. | |
| 2015/0264061 A1 | 9/2015 | Ibatullin et al. | |
| 2015/0288706 A1 | 10/2015 | Marshall | |
| 2015/0288709 A1 | 10/2015 | Singhal et al. | |
| 2015/0310213 A1 | 10/2015 | Ronen et al. | |
| 2015/0317672 A1 | 11/2015 | Espinoza et al. | |
| 2015/0347756 A1 | 12/2015 | Hidayat et al. | |
| 2015/0350229 A1 | 12/2015 | Mitchell | |
| 2015/0381649 A1 | 12/2015 | Schultz et al. | |
| 2016/0036849 A1 | 2/2016 | Zakian | |
| 2016/0065613 A1 | 3/2016 | Cho et al. | |
| 2016/0119373 A1 | 4/2016 | Fausto et al. | |
| 2016/0140466 A1 | 5/2016 | Sidebottom | |
| 2016/0147992 A1 | 5/2016 | Zhao et al. | |
| 2016/0162602 A1* | 6/2016 | Bradish | G06F 16/90344 707/769 |
| 2016/0171415 A1 | 6/2016 | Yampolskiy et al. | |
| 2016/0173522 A1* | 6/2016 | Yampolskiy | H04W 84/12 726/25 |
| 2016/0182537 A1 | 6/2016 | Tatourian et al. | |
| 2016/0189301 A1 | 6/2016 | Ng et al. | |
| 2016/0191554 A1 | 6/2016 | Kaminsky | |
| 2016/0205126 A1 | 7/2016 | Boyer et al. | |
| 2016/0248797 A1 | 8/2016 | Yampolskiy et al. | |
| 2016/0253500 A1 | 9/2016 | Alme et al. | |
| 2016/0259945 A1 | 9/2016 | Yampolskiy et al. | |
| 2016/0337387 A1 | 11/2016 | Hu et al. | |
| 2016/0344801 A1 | 11/2016 | Akkarawittayapoom | |
| 2016/0364496 A1 | 12/2016 | Li | |
| 2016/0373485 A1 | 12/2016 | Kamble | |
| 2017/0048267 A1 | 2/2017 | Yampolskiy et al. | |
| 2017/0063901 A1 | 3/2017 | Muddu et al. | |
| 2017/0161409 A1 | 6/2017 | Martin | |
| 2017/0236078 A1 | 8/2017 | Rasumov | |
| 2017/0237764 A1 | 8/2017 | Rasumov | |
| 2017/0279843 A1 | 9/2017 | Schultz et al. | |
| 2017/0300911 A1 | 10/2017 | Alnajem | |
| 2017/0316324 A1 | 11/2017 | Barrett et al. | |
| 2017/0318045 A1 | 11/2017 | Johns et al. | |
| 2017/0324766 A1 | 11/2017 | Gonzalez | |
| 2017/0337487 A1 | 11/2017 | Nock et al. | |
| 2018/0013716 A1 | 1/2018 | Connell et al. | |
| 2018/0103043 A1 | 4/2018 | Kupreev et al. | |
| 2018/0123934 A1 | 5/2018 | Gissing et al. | |
| 2018/0124110 A1 | 5/2018 | Hunt et al. | |
| 2018/0139180 A1 | 5/2018 | Napchi et al. | |
| 2018/0157468 A1 | 6/2018 | Stachura | |
| 2018/0322584 A1 | 11/2018 | Crabtree et al. | |
| 2018/0336348 A1 | 11/2018 | Ng et al. | |
| 2018/0337938 A1 | 11/2018 | Kneib et al. | |
| 2018/0337941 A1 | 11/2018 | Kraning et al. | |
| 2018/0365519 A1 | 12/2018 | Pollard et al. | |
| 2018/0375896 A1 | 12/2018 | Wang et al. | |
| 2019/0034845 A1 | 1/2019 | Mo et al. | |
| 2019/0089711 A1 | 3/2019 | Faulkner | |
| 2019/0098025 A1 | 3/2019 | Lim | |
| 2019/0140925 A1 | 5/2019 | Pon et al. | |
| 2019/0147378 A1 | 5/2019 | Mo et al. | |
| 2019/0303574 A1 | 10/2019 | Lamay et al. | |
| 2019/0379632 A1* | 12/2019 | Dahlberg | H04L 51/28 |
| 2019/0392252 A1 | 12/2019 | Fighel et al. | |
| 2020/0053127 A1 | 2/2020 | Brotherton et al. | |
| 2020/0074084 A1 | 3/2020 | Dorrans et al. | |
| 2020/0092172 A1* | 3/2020 | Kumaran | H04B 17/345 |
| 2020/0106798 A1* | 4/2020 | Lin | H04L 63/20 |

OTHER PUBLICATIONS

U.S. Appl. No. 15/271,655 Published as: US2018/0083999, Self-Published Security Risk Management, filed Sep. 21, 2016.

U.S. Appl. No. 15/377,574 U.S. Pat. No. 9,705,932, Methods and Systems for Creating, De-Duplicating, and Accessing Data Using an Object Storage System, filed Dec. 13, 2016.

U.S. Appl. No. 14/021,585 U.S. Pat. No. 9,438,615 Published as: US2015/0074579, Security Risk Management, filed Sep. 9, 2013.

U.S. Appl. No. 15/216,955 Published as: US2016/0330231, Methods for Using Organizational Behavior for Risk Ratings, filed Jul. 22, 2016.

U.S. Appl. No. 15/239,063 Published as: US2017/0093901, Security Risk Management, filed Aug. 17, 2016.

U.S. Appl. No. 16/405,121 Published as: US2019/0260791, Methods for Using Organizational Behavior for Risk Ratings, filed May 7, 2019.

U.S. Appl. No. 13/240,572 Published as: US2016/0205126, Information Technology Security Assessment System, filed Sep. 22, 2011.

U.S. Appl. No. 14/944,484 U.S. Pat. No. 9,973,524 Published as: US2016/0323308, Information Technology Security Assessment System, filed Nov. 18, 2015.

U.S. Appl. No. 15/142,677 U.S. Pat. No. 9,830,569 Published as: US/2016/0239772, Security Assessment Using Service Provider Digital Asset Information, filed Apr. 29, 2016.

U.S. Appl. No. 15/134,845 U.S. Pat. No. 9,680,858, Annotation Platform for a Security Risk System, filed Apr. 21, 2016.

U.S. Appl. No. 15/044,952 Published as: US2017/0236077, Relationships Among Technology Assets and Services and the Entities Responsible for Them, filed Feb. 16, 2016.

U.S. Appl. No. 15/089,375 U.S. Pat. No. 10,176,445 Published as: US2017/0236079, Relationships Among Technology Assets and Services and the Entities Responsible for Them, filed Apr. 1, 2016.

U.S. Appl. No. 29/589,298 U.S. Pat. No. D. 835,631, Computer Display Screen With Graphical User Interface, filed Mar. 24, 2017.

U.S. Appl. No. 29/589,299 U.S. Pat. No. D. 818,475, Computer Display With Security Ratings Graphical User Interface, filed Mar. 24, 2017.

U.S. Appl. No. 29/599,622, Computer Display With Security Ratings Graphical User Interface, filed Apr. 5, 2017.

U.S. Appl. No. 29/599,620, Computer Display With Security Ratings Graphical User Interface, filed Apr. 5, 2017.

U.S. Appl. No. 16/015,686, Methods for Mapping IP Addresses and Domains to Organizations Using User Activity Data, filed Jun. 22, 2018.

(56) References Cited

OTHER PUBLICATIONS

U.S. Appl. No. 16/543,075, Methods for Mapping IP Addresses and Domains to Organizations Using User Activity Data, filed Aug. 16, 2019.
U.S. Appl. No. 16/738,825, Methods for Mapping IP Addresses and Domains to Organizations Using User Activity Data, filed Jan. 9, 2020.
U.S. Appl. No. 15/918,286, Correlated Risk in Cybersecurity, filed Mar. 12, 2018.
U.S. Appl. No. 16/292,956, Correlated Risk in Cybersecurity, filed May 5, 2019.
U.S. Appl. No. 16/795,056, Correlated Risk in Cybersecurity, filed Feb. 19, 2020.
U.S. Appl. No. 16/170,680, Systems and Methods for Remote Detection of Software Through Browser Webinjects, filed Oct. 25, 2018.
U.S. Appl. No. 16/688,647, Systems and Methods for Remote Detection of Software Through Browser Webinjects, filed Nov. 19, 2019.
U.S. Appl. No. 15/954,921, Systems and Methods for External Detection of Misconfigured Systems, filed Apr. 17, 2018.
U.S. Appl. No. 16/549,764, Systems and Methods for Inferring Entity Relationships via Network Communications of Users or User Devices, filed Aug. 23, 2019.
U.S. Appl. No. 16/787,650, Systems and Methods for Inferring Entity Relationships via Network Communications of Users or User Devices, filed Feb. 11, 2020.
U.S. Appl. No. 29/666,942, Computer Display With Graphical User Interface, filed Oct. 17, 2018.
U.S. Appl. No. 16/514,771, Systems and Methods for Generating Security Improvement Plans for Entities, filed Jul. 17, 2019.
U.S. Appl. No. 29/677,306, Computer Display With Corporate Hierarchy Graphical User Interface Computer Display With Corporate Hierarchy Graphical User Interface, filed Jan. 18, 2019.
U.S. Appl. No. 16/775,840, Systems and Methods for Assessing Cybersecurity State of Entities Based on Computer Network Characterization, filed Jan. 29, 2020.
U.S. Appl. No. 16/779,437, Systems and Methods for Rapidly Generating Security Ratings, filed Jan. 31, 2020.
U.S. Appl. No. 16/802,232, Systems and Methods for Improving a Security Profile of an Entity Based on Peer Security Profiles, filed Feb. 26, 2020.
U.S. Appl. No. 29/725,724, Computer Display With Risk Vectors Graphical User Interface, filed Feb. 26, 2020.
U.S. Appl. No. 15/271,655, the Office Actions dated Feb. 21, 2017 and Aug. 18, 2017.
U.S. Appl. No. 15/377,574, now U.S. Pat. No. 9,705,932, the Office Action dated Mar. 2, 2017 and the Notice of Allowance dated Jun. 1, 2017.
U.S. Appl. No. 14/021,585, now U.S. Pat. No. 9,438,615, the Office Action dated Mar. 11, 2016 and the Notice of Allowance dated Aug. 9, 2016.
U.S. Appl. No. 15/216,955, now U.S. Pat. No. 10,326,786, the Office Actions dated Nov. 4, 2016, Mar. 9, 2017, Jun. 6, 2017, Dec. 5, 2017, and Aug. 29, 2018, and the Notice of Allowance dated Feb. 6, 2019.
U.S. Appl. No. 15/239,063, now U.S. Pat. No. 10,341,370, the Office Action dated Mar. 21, 2018 and the Notice of Allowance dated Jan. 14, 2019.
U.S. Appl. No. 16/405,121, the Office Action dated Aug. 1, 2019 and Nov. 21, 2019.
U.S. Appl. No. 13/240,572, the Office Actions dated Nov. 21, 2013, Jun. 16, 2014, Feb. 27, 2015, Jun. 3, 2015, Oct. 26, 2015, Mar. 10, 2016 Feb. 13, 2017.
U.S. Appl. No. 14/944,484, now U.S. Pat. No. 9,973,524, the Office Actions dated Mar. 11, 2016, Jul. 5, 2016 and Jan. 17, 2017 and the Notice of Allowance dated Oct. 20, 2017.
U.S. Appl. No. 15/142,677, now U.S. Pat. No. 9,830,569, the Office Actions dated Jul. 26, 2016 and Apr. 24, 2017 and the Notice of Allowance dated Oct. 11, 2017.
U.S. Appl. No. 15/134,845, now U.S. Pat. No. 9,680,858, the Office Actions dated Jul. 19, 2016 and Jan. 26, 2017, and the Notices of Allowance dated Apr. 27, 2017 and May 9, 2017.
U.S. Appl. No. 15/044,952, the Office Action dated Jul. 8, 2019 and Feb. 21, 2020.
U.S. Appl. No. 15/089,375, now U.S. Pat. No. 10,176,445, the Office Actions dated Sep. 9, 2016, May 17, 2017, and Nov. 17, 2017 and the Notice of Allowance dated Aug. 9, 2018.
U.S. Appl. No. 29/598,298, now U.S. Pat. No. D. 835,631, the Notice of Allowance dated Aug. 15, 2018.
U.S. Appl. No. 29/598,299, now U.S. Pat. No. D. 818,475, the Notice of Allowance dated Jan. 2, 2018.
U.S. Appl. No. 29/599,622, now U.S. Pat. No. D. 847,169, the Notice of Allowance dated Dec. 11, 2018.
U.S. Appl. No. 29/599,620, now U.S. Pat. No. D. 846,562, the Office Action dated May 3, 2018, the Notice of Allowance dated Nov. 27, 2018.
U.S. Appl. No. 16/015,686, now U.S. Pat. No. 10,425,380, the Office Action dated Nov. 16, 2018 and the Notice of Allowance dated May 10, 2019.
U.S. Appl. No. 16/543,075, the Notice of Allowance dated Sep. 25, 2019.
U.S. Appl. No. 16/738,825, the Office Action dated Jul. 8, 2019 and Feb. 21, 2020.
U.S. Appl. No. 15/918,286, now U.S. Pat. No. 10,257,219, the Office Action dated Aug. 7, 2018 and the Notice of Allowance dated Nov. 29, 2018.
U.S. Appl. No. 16/292,956, the Office Action dated Jul. 10, 2019 and the Notices of Allowance dated Jan. 8, 2020 and Jan. 27, 2020.
U.S. Appl. No. 16/795,056, the Office Action dated May 1, 2020.
U.S. Appl. No. 16/170,680, the Office Action dated Mar. 26, 2019; the Notices of Allowance dated Oct. 29, 2019 and Aug. 27, 2019.
U.S. Appl. No. 16/688,647, the Office Action dated Jan. 29, 2020; the Notice of Allowance dated May 12, 2020.
U.S. Appl. No. 15/954,921, the Office Actions dated Sep. 4, 2018, Jan. 3, 2019, Aug. 19, 2019, and Dec. 5, 2019; Advisory Action dated Mar. 3, 2020.
U.S. Appl. No. 16/787,650, the Notice of Allowance dated Apr. 7, 2020.
U.S. Appl. 29/666,942, the Notice of Allowance dated Apr. 20, 2020.
U.S. Appl. No. 16/360,641, the Office Action dated Aug. 7, 2019 and Feb. 20, 2020.
U.S. Appl. No. 16/514,771, the Office Action dated Dec. 4, 2019; the Notice of Allowance dated Mar. 18, 2020.
U.S. Appl. No. 16/775,840, the Notice of Allowance dated May 19, 2020.
U.S. Appl. No. 16/802,232, the Notice of Allowance dated Apr. 24, 2020.
BitSight, "Cyber Security Myths Versus Reality: How Optimism Bias Contributes to Inaccurate Perceptions of Risk", Jun. 2015, Dimensional Research, pp. 1-9.
Transaction history of U.S. Appl. No. 13/240,572 as of Oct. 7, 2015, application as filed and pending claims, 45 pages.
Transaction history of U.S. Appl. No. 13/240,572 and pending claims as of Mar. 22, 2016, 10 pages.
Provos et al., "The Ghost in the Browser Analysis of Web-based Malware", 2007 (9 pages).
Li et al., "Finding the Linchpins of the Dark Web: a Study on Topologically Dedicated Hosts on Malicious Web Infrastructures", IEEE, 2013 (15 pages).
Bhilare et al., "Protecting Intellectual Property and Sensitive Information in Academic Campuses from Trusted Insiders: Leveraging Active Directory", SIGUCC, Oct. 2009 (5 pages).
Jin et al, "Identifying and tracking suspicious activities through IP gray space analysis", MineNet, Jun. 12, 2007 (6 pages).
Chuvakin, "SIEM: Moving beyond compliance", RSA White Paper (2010) (16 pages).
Transaction history and pending claims for U.S. Appl. No. 14/021,585, as of Apr. 29, 2016, 2 pages.
Transaction history, application as filed and pending claims for U.S. Appl. No. 13/240,572 as of Apr. 29, 2016, 46 pages.

(56) References Cited

OTHER PUBLICATIONS

Transaction history, application as filed and pending claims for U.S. Appl. No. 14/944,484 as of Apr. 29, 2016, 4 pages.
Transaction history and pending claims for USSN 14/021,585, as of Nov. 18, 2015, 6 pages.
Application as filed, transaction history and pending claims of U.S. Appl. No. 13/240,572 as of Nov. 18, 2015, 45 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796. 8 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Gephi (gephi.org), accessed on the internet at https://web.archive.org/web/20151216223216/https://gephi.org/; Dec. 16, 2015; 1 page.
Mile 2 CPTE Maltego Demo, accessed on the internet at https://www.youtube.com/watch?v=o2oNKOUzPOU; Jul. 12, 2012; 1 page.
"Neo4j (neo4j.com)," accessed on the internet at https://web.archive.org/web/20151220150341/http://neo4j.com:80/developer/guide-data-visualization/; Dec. 20, 2015; 1 page.
"Creating Transparency with Palantir," accessed on the internet at https://www.youtube.com/watch?v=8cbGChfagUA; Jul. 5, 2012; 1 page.
"Palantir Cyber: Uncovering malicious behavior at petabyte scale," accessed on the internet at https://www.youtube.com/watch?v=EhYezV06EE; Dec. 21, 2012; 1 page.
Borgatti, et al., "On Social Network Analysis in a Supply Chain Context," Journal of Supply Chain Management; 45(2): 5-22; Apr. 2009, 18 pages.
Carstens, et al., "Modeling Company Risk and Importance in Supply Graphs," European Semantic Web Conference 2017: The Semantic Web pp. 18-31.
Gundert, Levi, "Big Data in Security—Part III: Graph Analytics," accessed on the Internet at https://blogs.cisco.com/security/big-data-in-security-part-III-graph-analytics; Cisco Blog, Dec. 2013, 8 pages.
Jean, "Cyber Security: How to use graphs to do an attack analysis," accessed on the internet at https://linkurio.us/blog/cyber-security-use-graphs-attack-analysis/; Aug. 2014, 11 pages.
"Palantir.com," accessed on the internet at http://www.palantir.com/; Dec. 2015; 2 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
"Maltego XL," accessed on the Internet at https://www.paterva.com/web7/buy/maltegoclients/maltego-xl.php, 5 pages.
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
Noel, et al., "Big-Data Architecture for Cyber Attack Graphs, Representing Security Relationships in NoSQL Graph Databases," The MITRE Corporation, 2014, 6 pages.
Wagner, et al., "Assessing the vulnerability of supply chains using graph theory," Int. J. Production Economics 126 (2010) 121-129.
Moradi, et al., "Quantitative Models for Supply Chain Management," IGI Global, 2012, 29 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
"About Neo4j," 1 page.
"Amazon Mechanical Turk," accessed on the internet at https://www.mturk.com/; 7 pages.
"Rapid7 Nexpose Vulnerability Scanner," accessed on the internet at https://www.rapid7.com/products/nexpose/download/, 3 pages.
"Tenable Nessus Network Vulnerability Scanner," accessed on the internet at https://www.tenable.com/products/nessus/nessus-professional; 13 pages.
"Computer Network Graph," http://www.opte.org; 1 page.
McNab, "Network Security Assessment," copyright 2004, 56 pages.
Gilgur, et al., "Percentile-Based Approach to Forecasting Workload Growth" Proceedings of CMG'15 Performance and Capacity International Conference by the Computer Measurement Group. No. 2015 (Year:2015).
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Search Query Report form IP.com (performed Apr. 27, 2020).

* cited by examiner

| | | | | | |
|---|---|---|---|---|---|
| 2018-09-14 | 10:00:00, | linksys, | 00:50:2A:43:88:21, | 38.243, -12.491, | 192.0.2.82 |
| 2018-09-14 | 10:03:24, | linksys, | 00:50:2A:43:88:21, | 38.244, -12.492, | 192.0.2.82 |
| 2018-09-14 | 10:04:01, | ExampleCorp, | 00:99:1D:38:0B:77, | 24.141, -10.113, | 203.0.113.102 |
| 2018-09-14 | 10:05:17, | linksys, | 00:50:2A:43:88:21, | 38.243, -12.492, | 192.0.2.82 |
| 2018-09-14 | 10:05:59, | WiFi438821, | 00:50:2A:43:88:21, | 32.343, -10.412, | 192.0.2.211 |
| 2018-09-14 | 10:06:11, | ExampleCorp, | 00:99:1D:38:0B:77, | 24.142, -10.114, | 203.0.113.102 |
| 2018-09-14 | 10:06:43, | ExampleCorpGuest, | 00:99:1D:38:0B:77, | 24.142, -10.114, | 203.0.113.101 |
| 2018-09-14 | 10:10:58, | ExampleCorp, | 00:99:1D:38:0B:77, | 24.142, -10.114, | 203.0.113.102 |

FIG. 4

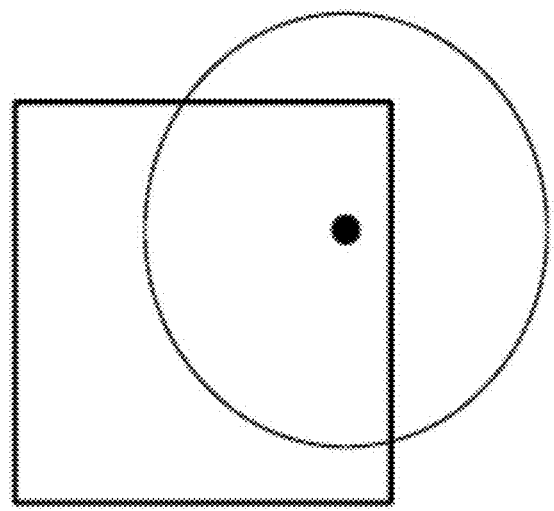
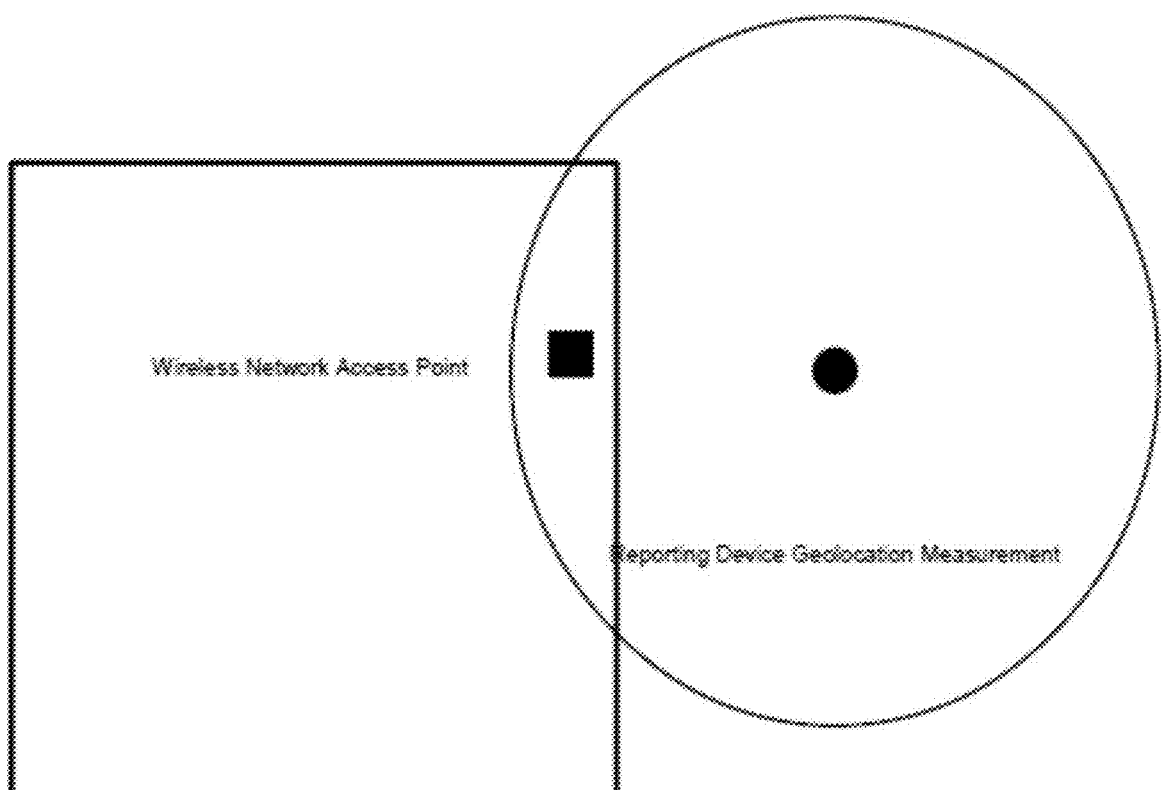
FIG. 11

```
Website Log Dataset timestamp       client_ip        url                          host
3/1/18 21:29    192.0.2.125      /application/admin/home
3/1/18 21:32    203.0.113.241    acmeoffice.com               firstbank.com
3/1/18 21:39    203.0.113.241    /blog/latest.html
                                 /blog/archive.html           acmeoffice.com
3/1/18 21:41    198.51.100.123   deathstar.org                index.html
```

```
Entity Management Dataset domain              entity name
firstbank.com       "First Bank Inc."
acmeoffice.com      "Acme Corp."
```

FIG. 17

Website Log Dataset

| timestamp | client_ip | host | url |
|---|---|---|---|
| 3/1/18 21:29 | 192.0.2.125 | firstbank.com | /application/admin/home |
| 3/1/18 21:32 | 203.0.113.241 | acmeoffice.com | /blog/latest.html |
| 3/1/18 21:39 | 203.0.113.241 | acmeoffice.com | /blog/archive.html |
| 3/1/18 21:41 | 198.51.100.123 | deathstar.org | index.html |

Authenticated URL Knowledge Base

| url | requires_authentication |
|---|---|
| /application/admin/home | true |
| /blog/latest.html | false |

Entity Management Dataset

| domain | entity_name |
|---|---|
| firstbank.com -> | "First Bank Inc.*" |
| acmeoffice.com -> | "Acme Corp.*" |

FIG. 18

| 192.0.2.0.125 | 20.8 | -96.2 | a2e4d20fb96b | Firstbank-wifi |
| 203.0.113.0.241 | 3.03 | -59.9 | 0a6590d54270 | AcmeOffice-secure |
| 198.51.100.123 | 24.3 | 54.6 | 1a02076320900 | Deathstar |

FIG. 20

SYSTEMS AND METHODS FOR NETWORK ASSET DISCOVERY AND ASSOCIATION THEREOF WITH ENTITIES

FIELD OF THE INVENTION

This disclosure generally relates to techniques for cybersecurity assessment and, more specifically, to observing and analyzing network communications and to identifying the digital assets of entities of interest using the observed network communications.

BACKGROUND

Many entities, such as small and large offices, hospitals, banks, airports, hotels, retailers, etc., usually provide WiFi networks to their employees, guests, and/or visitors. A WiFi network is generally provided via one or more Access Points (APs) distributed throughout the premises of the entity. A WiFi network can be identified by its service set identifier (SSID) which is the primary name associated with a wireless local area network (WLAN), including home networks and public hotspots, An AP providing a WiFi network is generally identified by the AP's bask service set identifier (BSSID), which is the MAC address of the wireless access point (WAP) generated by combining the 24 bit Organization Unique Identifier (e.g., the manufacturer's identity) and the manufacturer's assigned 24-bit identifier for the radio chipset in the WAP.

User devices (smart phones, tablets, laptops, Internet of Things (IoT) devices, desktops, smart home assistants, etc.) can connect to a WiFi network and may access devices and/or services that are accessible via the same WiFi network or other networks such an entity's proprietary network and/or the Internet. To this end, the user device is allocated an Internet Protocol (IP) address. The IP address is generally provided by and is associated with the entity that provides the WiFi network. The WiFi network (identified by its SSID), the AP (identified by its B SSID), and the IP address(es) provided to user device(s) are generally the digital assets of that entity. It should be understood that an entity may also own and/or use other kinds of digital assets, as well, such as web servers, network-connected databases, etc.

An important factor in the overall assessment of the cybersecurity at an entity of interest is the knowledge of the digital assets of that entity, especially, the assets such as WiFi networks and APs, because these assets would generally be involved in an attack on the entities internal networks and systems. Discovering and/or having an up to date, comprehensive knowledge of an entities digital assets is not an easy or a straightforward task, however. A large entity/organization may own and/or use hundreds, thousands, or even more assets that may be dispersed throughout a country or the world. Organizations themselves can be complex, having a hierarchical structure of several business entities, where each of those entities may own/use several assets. Moreover, new assets are often added and the old ones are often discarded or updated. As such, even a comprehensive knowledge obtained about an entity's assets at one time may no longer be complete or accurate at another time.

SUMMARY

Various embodiments described herein feature techniques and systems that can discover digital assets (also called assets), that generally include WiFi networks identified by their SSIDs, Access Points (APs) identified by their BSSIDs, and IP addresses, and associate the discovered assets to the entities that provide, use, and/or own these assets. To this end, various embodiments of an entity-asset association system uses one or more public databases that provide publicly known information about entities, such as business address(es) of an entity of interest, IP addresses used/owned by the entity, etc. These database(s) (also called Entity Management (EM) databases, EM datasets, or primary dataset(s)) are used in conjunction with network communication observations (also called secondary dataset(s)), that are generated and provided by the entities, their business partners, and/or various third parties, such as Internet Service Providers (ISPs), other, web-based service provides, etc.

In general, assets are discovered from the secondary dataset(s), and additional information about the discovered assets is used to query the primary dataset to identify an entity that likely owns and/or uses the identified asset(s). An association between the identified entity and the identified asset(s) can then be established. Either or both datasets may be monitored on an on-going basis, so that the entity-asset associations that have been discovered previously can be updated or discarded, e.g., based on new network observations included in a secondary dataset. The confidence in the association between an entity and one or more assets can be improved using various attributes of the network observations and the associated metadata that may be included in one or more secondary datasets.

Accordingly, in one aspect a method is provided for identifying networking assets of an entity. The method includes accessing a dataset of network observations that include network access information derived from a number of devices seeking network access or connected to a network. The devices can be smart phones, tablets, laptops, desktops, and other computing devices. The dataset includes several tuples, where each tuple includes a service set identifier (SSID) identifying a network accessed by a device and a network observation parameter.

The method also includes evaluating from each tuple the corresponding SSID using a specified entity name, and identifying one or more SSIDs that match with the specified entity name. A match may be determined to exist when there is a partial overlap between the specified entity name and the SSID. In addition, the method includes filtering the one or more SSIDs according to the network observation parameter, and designating the one or more filtered SSIDs as one or more networking assets of the entity.

In some embodiments, the evaluating step in the context of a particular SSID includes transforming the name into a number of distinct sub strings, and comparing each sub string with that particular SSID. Additionally or in the alternative, evaluating step in the context of a particular SSID may include scoring the particular SSID based on a degree of match between that particular SSID and the specified entity name, and the step of identifying the one or more SSIDs includes selecting SSIDs having a score at least equal to a specified threshold.

In some embodiments, in each tuple, the respective network observation parameter includes a respective location of a device accessing a network that is indicated by the corresponding SSID. The filtering step may include removing from the identified one or more SSIDs, an SSID where a location of a device accessing a network indicated by that SSID does not match with any location of the entity. Alternatively, the method may include designating location(s) of one or more devices included in the tuples corresponding to the designated SSID(s) as location(s) of the entity.

In some embodiments, in each tuple, the respective network observation parameter includes a respective network address, e.g., an IP address, of a device accessing a network indicated by the corresponding SSID. The filtering step may include removing from the identified one or more SSIDs, an SSID where a network address of a device accessing a network indicated by that SSID does not match with any network address belonging to the entity. Alternatively, the method may include designating the network addresses of the devices included in the tuples corresponding to the designated SSIDs as network addresses of the entity.

In some embodiments, each tuple includes a timestamp indicating the time at which network access by the corresponding device was observed. The method may include dividing a specified time window into a specified number of time partitions, and identifying all tuples that include a particular SSID. The method may further include identifying all time partitions corresponding to the respective timestamps included in the identified tuples, and determining that a total number of the identified partitions is less than a specified observation-count threshold. In addition, the method may include discarding, prior to the evaluating, selecting, or designating steps, the identified tuples that failed to meet the observation-count threshold.

In another aspect, a system is provided for identifying networking assets of an entity. The system includes a processor, and a network port in communication with the processor and adapted to receive or access from one or more data sources one or more datasets of network observations. A dataset of network observations may include network access information derived from a number of devices seeking network access or connected to a network. In particular, a dataset includes several tuples, where each tuple includes a service set identifier (SSID) identifying a network accessed by a device and a network observation parameter. The devices can be smart phones, tablets, laptops, desktops, and other computing devices.

The system also includes a memory coupled to the processor and having stored therein instructions which, when executed by the processor, program the processor to: evaluate from each tuple the corresponding SSID using a specified entity name, and identify one or more SSIDs that match with the specified entity name. A match may be determined to exist when there is a partial overlap between the specified entity name and the SSID. In addition, the instructions program the processor to filter the one or more SSIDs according to the network observation parameter, and designate the one or more filtered SSIDs as one or more networking assets of the entity. In various embodiments, the instructions can program the processor to perform one or more of the additional method steps described above.

In another aspect, a method is provided for identifying networking assets of an entity. The method includes the step of: accessing a dataset of network access information derived from a number of devices seeking network access or connected to a network, where the dataset includes several tuples, where each tuple includes: (a) a location of a device, and (b)(i) a service set identifier (SSID) representing a network accessed by the device, or (ii) a basic service set identifier (BSSID) corresponding to an access point of the network accessed by the device, or (iii) a network address, e.g., an IP address, designated to the device. The method also includes the steps of: selecting one or more tuples where the location of the device matches with a location of a specified entity, and designating: (i) the one or more SSIDs in the one or more selected tuples, or (ii) the one or more BSSIDs in the one or more selected tuples, or (iii) the one or more network addresses in the one or more selected tuples as networking asset or assets of the entity.

In some embodiments, the method includes translating the location of a device from a tuple into a latitude-longitude location representation, or translating the location of the specified entity into a latitude-longitude location representation. The method may include, when a respective horizontal positioning error (HPE) value associated with a respective device location in a set of tuples is greater than a location-error threshold, omitting from the dataset the set of such tuples, prior to the selecting step. Determining that the location of the device matches with the location of the specified entity may include evaluating a continuous distance metric or a discrete distance metric. The continuous distance metric or the discrete distance metric may correspond to a size of premise of the entity.

In another aspect, a system is provided for identifying networking assets of an entity. The system includes a processor, and a network port in communication with the processor and adapted to receive or access from one or more data sources one or more datasets of network observations. A dataset of network observations may include network access information derived from a number of devices seeking network access or connected to a network. In particular, a dataset includes several tuples, where each tuple includes: (a) a location of a device, and (b)(i) a service set identifier (SSID) representing a network accessed by the device, or (ii) a basic service set identifier (BSSID) corresponding to an access point of the network accessed by the device, or (iii) a network address, e.g., an IP address, designated to the device.

The system also includes a memory coupled to the processor and having stored therein instructions which, when executed by the processor, program the processor to: select one or more tuples where the location of the device matches with a location of a specified entity, and designate: (i) the one or more SSIDs in the one or more selected tuples, or (ii) the one or more BSSIDs in the one or more selected tuples, or (iii) the one or more network addresses in the one or more selected tuples as networking asset or assets of the entity. In various embodiments, the instructions can program the processor to perform one or more of the additional method steps described above.

In another aspect, a method is provided for identifying networking assets of an entity. The method includes the steps of: obtaining a dataset having network access information derived from a number of devices seeking network access or connected to a network, where the dataset includes several tuples, where each tuple includes: (a) a network address, e.g., an IP address, designated to the device, and (b)(i) a service set identifier (SSID) representing a network accessed by the device, or (ii) a basic service set identifier (BSSID) corresponding to an access point of the network accessed by the device. The method also includes the steps of: selecting one or more tuples where the network address designated to the device matches with a set of network addresses associated with a specified entity, and designating: (i) the one or more SSIDs in the one or more selected tuples, or (ii) the one or more BSSIDs in the one or more selected tuples as networking asset or assets of the entity.

In some embodiments, each tuple includes a location of the device, and the designating step includes determining that the location of the device in the tuple matches with a location of the specified entity. If it is determined that the location of the device in a particular tuple does not match with the location of the specified entity, the SSID(s) or BSSID(s) in that tuple may be designated as networking asset(s) of the entity. In some embodiments, In some embodiments, each tuple includes a location of the device, and the method includes designating the location of the device as a location of the entity.

In another aspect, a system is provided for identifying networking assets of an entity. The system includes a processor, and a network port in communication with the processor and adapted to obtain, receive, or access from one or more data sources one or more datasets of network observations. A dataset of network observations may include network access information derived from a number of devices seeking network access or connected to a network. In particular, a dataset includes several tuples, where each tuple includes: (a) a network address, e.g., an IP address, designated to the device, and (b)(i) a service set identifier (SSID) representing a network accessed by the device, or (ii) a basic service set identifier (BSSID) corresponding to an access point of the network accessed by the device.

The system also includes a memory coupled to the processor and having stored therein instructions which, when executed by the processor, program the processor to: select one or more tuples where the network address designated to the device matches with a set of network addresses associated with a specified entity, and designate: (i) the one or more SSIDs in the one or more selected tuples, or (ii) the one or more BSSIDs in the one or more selected tuples as networking asset or assets of the entity. In various embodiments, the instructions can program the processor to perform one or more of the additional method steps described above.

BRIEF DESCRIPTION OF DRAWINGS

The present invention will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings:

FIG. 4 shows an example secondary datasets having network observations that may be used by various embodiments;

FIG. 11 illustrates errors that may occur while deriving entity-asset association using location information according to some embodiments;

FIGS. 17 and 18 show datasets used in discovering and/or evaluating using user behavior the IP addresses that are potentially associated with an entity using user identifiers, according to some embodiments;

FIG. 20 shows an example dataset used in discovering new assets and new entity-asset associations, according to some embodiments.

DETAILED DESCRIPTION

The ability to map client gateway IP addresses (also called "egress" IPs), i.e., the IP addresses assigned to the devices connected to a network owned, controlled, or used by an entity can be critical to the Security Ratings industry due to insight these IP addresses can provide regarding compromised systems and server/mobile software associated with an entity. Traditionally, it is very difficult to discover and assign such client gateway IPs to organizations since they are infrequently reflected in public registries. A novel method of discovering client gateway IPs and assigning them to organizations relies on client wireless configuration details and an entity management dataset used by Security Ratings companies. When an entity management dataset is combined with a broad-scale dataset containing client wireless configuration details, unique and semi-unique identifiers present in the wireless configuration dataset (e.g. BSSID/SSIDs) can be used as a pivot to discover new IP addresses belonging to organizations that are not currently present in the entity mapping dataset. In addition, identifying candidate wireless networks using a combination of the geolocation of a wireless network with its SSID and comparing those data points to metadata about a company can reveal wireless networks and IP addresses associated to that company.

Mapping using geolocation data in a network observation that also includes a device's IP address is a peculiar way of discovering IP addresses associated with a business that are otherwise not reported by that business or by the business's service providers and/or is not revealed through traditional means. The location coordinates can be filtered for reliability, precision, accuracy, and frequency of appearance at a given location with thresholds that can exclude noise and known errors. Additional techniques described herein can monitor changes in the datasets to pivot and discover new IP addresses. The newly discovered associations can be used to expand the EM database(s), increasing the recall of security events for entities and the overall fidelity of security ratings.

Figure 1:
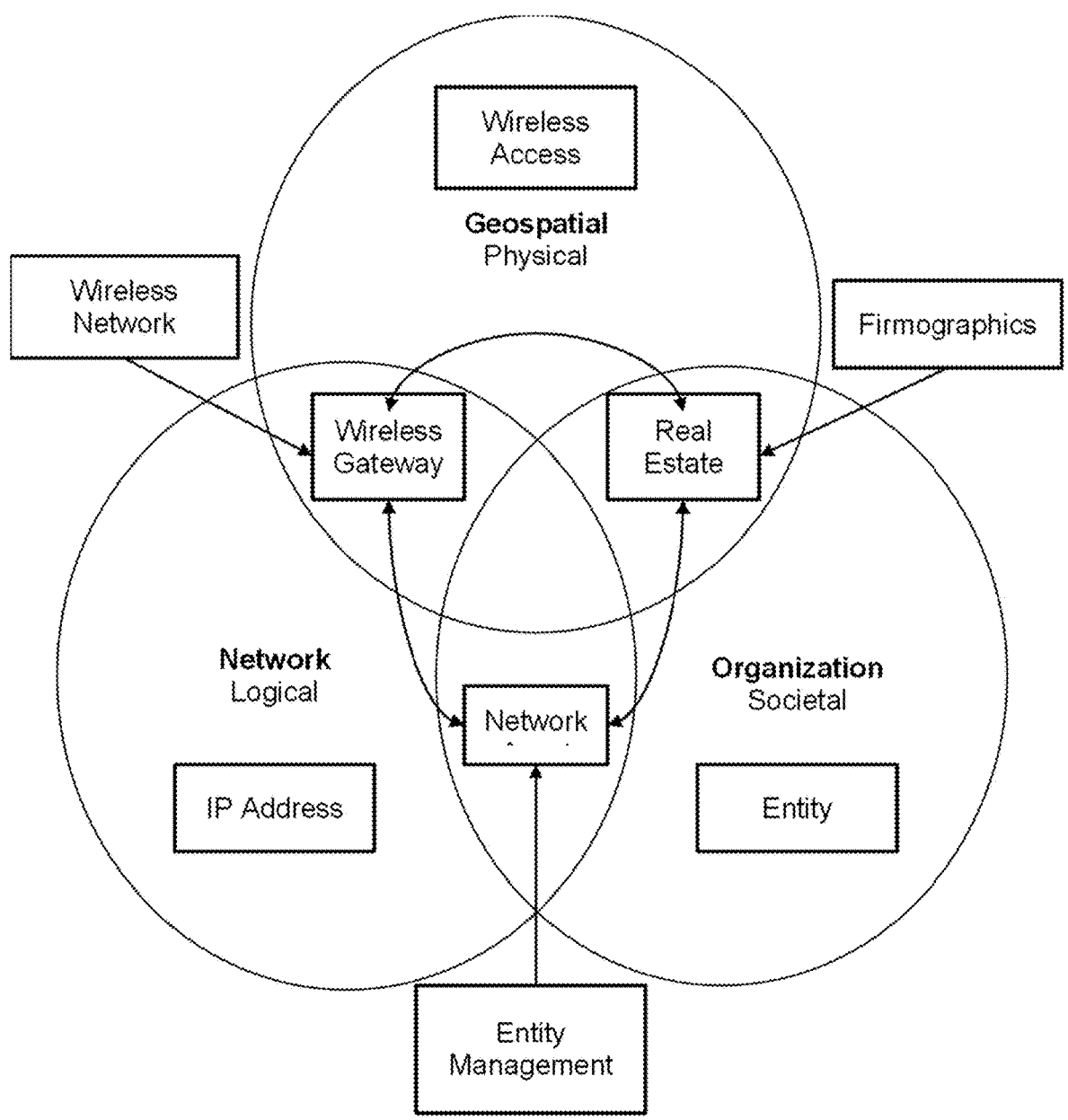
FIG. 1 schematically depicts linkages across different discovery domains, according to various embodiments.

With reference to FIG. 1, new entity-asset relationships can be discovered across information domains using datasets that provide such associations within a particular domain. For instance, a firmographic data source that contains associations between entities and real estate owned or leased by each entity provides record linkage across the physical and societal domains. A physical datapoint, such as the geospatial coordinates of a building owned/leased by an entity, can then be used to discover co-located wireless access points potentially attributable to the entity. These associations may further provide record linkage into the logical network domain, through IP addresses discovered through observations of the discovered, co-located wireless access point(s) in a wireless network configuration dataset.

In general, various embodiments of an entity-asset association system described herein can discover, filter, and manage IP addresses and wireless network attributes that belong to various entities by unifying device geolocation, its associated wireless information, and observed IP addresses, with known geolocation information, wireless information, and/or IP addresses of an entity. As used herein, the terms "entity," "organization", "business", and "company" are used interchangeably.

Figure 2:
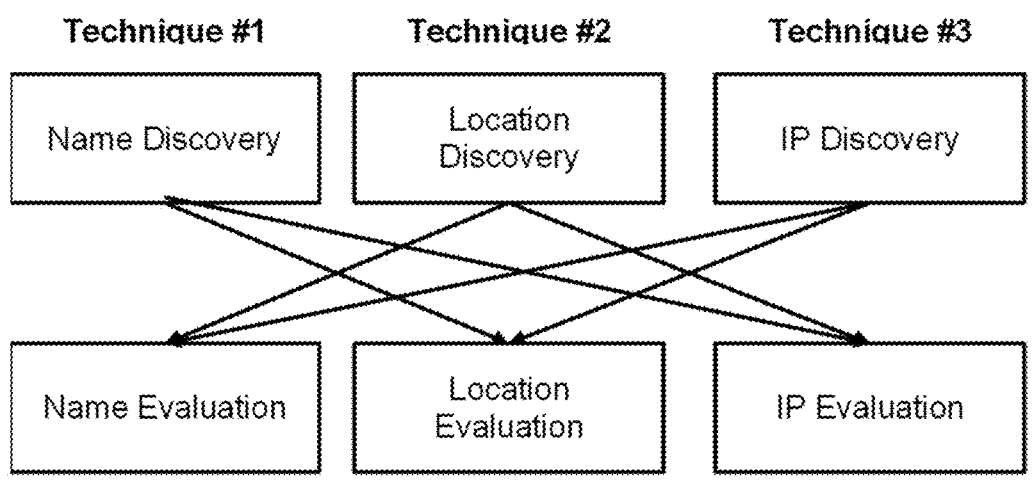
FIG. 2 schematically depicts three techniques for inferring entity-asset associations, according to various embodiments.

With reference to FIG. 2, an embodiment of the entity-asset association system may employ one or more of three distinct techniques for discovering an IP address(s) or wireless network(s) that may be associated with an entity. The system may also include techniques to validate the inferred associations and to monitor new information. Each technique may rely upon nearly all of the same attributes, and all of them also require the knowledge of some prior information about an entity or network (e.g., where the entity/network is physically located, known IP addresses used by the entity, etc.). Each of the three techniques involves unique obstacles, however, that may be overcome to handle erroneous cases, so that network attributes may be associated with entities in a robust and reliable manner.

The first technique involves understanding that a common pattern of wireless configuration exists within businesses where the SSID of the wireless network is often named similarly to the name of the business. As such, in some embodiments, a dataset that includes is indexed and may be queried, searching for names or "doing business as" of businesses to discover SSIDs that are similar to the name of the business. When candidate assets (e.g., SSIDs or BSSIDs, or associated IP address(es)) are discovered, the other attributes of the candidate data point(s), such as the latitude and longitude of a device that created the observation from which a particular candidate was identified (e.g., the observation was made when the device connected to the network corresponding to the discovered SSID), or the latitude and longitude of a device that separately observed the wireless network without connecting thereto, may be evaluated to understand if the candidate correspond to the known physical spaces, such as office or retail locations, used by the business of interest. Once evaluated, the SSID(s), BSSID(s), and/or IP address(es) can be associated with the business. These associations may be monitored subsequently, to determine that the associations are still current.

The second technique involves beginning with the knowledge of the physical location(s) of a company or business, obtained, e.g., using known techniques and systems. If a physical location is not already a latitude, longitude pair, or complex digital representation of the footprint of the business location, a geocoding service can be used to translate the address into coordinates. The dataset used by this technique may be indexed for querying and searching the location(s) of a business of interest, and these locations may then be used to discover any reported observations or events from devices within the bounds of these location(s). When candidate observations are identified, the SSID, or other available metadata, can be used to determine whether it is a sensible match the SSIDs, BSSIDs, IP addresses allocated to the devices reporting the observations, etc., to an organization or company of interest. Based on these evaluations, the accuracy of the location data points, and their proximity to the physical footprint of the entity of interest, the discovered SSID, BSSID, and/or IP addresses can be associated to the entity.

The third technique involves beginning with the knowledge of the IP address(es) of the company or business obtained, e.g., using known techniques and systems. The dataset herein can be indexed for querying and searching for observations and events that are reported in connection with the IP address(es) that are known to be associated with an entity of interest. Once evaluated, which can involve assessing the resulting events for frequency of observations on networks and related networks to eliminate erroneous assets, for example home wireless networks, among others, the SSID and BSSID can be associated with the entity of interest.

According to one or more of the techniques described above, once an SSID, BSSID, and/or an IP address is associated with a business, those attributes can be continuously observed in the dataset(s) through new observations and events, for changes to the data elements in the dataset that were used to infer the associations. The new observations and/or events can also be used to discover new IP addresses based on new user and/or user device activity. In general, combinations of previously observed elements (i.e., SSIDs, BSSIDs, and IP addresses) can be continuously monitored to observe and discover new elements. For example, once a set of SSID, BSSIDs, and IP address are associated to an organization, one of the following can be monitored to discover a new third element: (1) IP address and SSID can be monitored to find new BSSIDs not associated to the company; (2) IP address and BSSID can be monitored to find new SSIDs not associated to the company; and (3) SSID and BSSID can be monitored to find new IP addresses not associated to the company.

For each of the techniques described above, the following attributes of a dataset may be used by an entity-asset association system. For different techniques, one or more of the attributes are essential, while the others are optional, and one or more of the attributes that are essential to one technique may be optional for the other technique:

The IPv4 or IPv6 address of the device at the time the observation was produced. Typically required for Technique 3 and optional for Techniques 1 and 2.

Location coordinates of the device, encoded in any form, but ultimately translating to a latitude and longitude as a fixed point that is derived from the devices physical location. Generally required for Techniques 1 and 2 and optional for Technique 3.

Horizontal Positioning Estimate (HPE) of the reported location information. Optional for all techniques.

SSID of the connected wireless network of the device. Generally required for all techniques.

BSSID of the connected wireless network of the device. Generally required for all techniques.

Security attributes of the connected wireless network of the device. These can include the security configuration of the associated SSID/BSSID, such as WPA, WPA2, WPA2 Enterprise; and can also include operating modes such as EAP-TLS, EAP-TTLS, EAP-PEAP, among others. Optional for all techniques.

Device model information, such as its manufacturer, model, among others. Optional for all techniques.

System attributes, such as its operating system version, among others. Optional for all techniques.

Uniquely identifying attributes about the device, such as advertising identifiers, like ADID or IDFA, among others. Optional for all techniques.

Timestamp of the event. Generally required for all techniques, although it may be implied if the dataset is being provided as a real-time stream or slightly delayed stream where the time at which the event was received may be substituted for an explicit timestamp within the event that indicates the actual time of the event.

The events within the datasets used by the techniques described above are typically generated by a user or an application operating on a mobile device that would cause the measurement or observation of information to be submitted to a remote system that is primarily responsible for collecting such measurements. An example of such a remote system and telemetry collection is a system that collects telemetry related to a user's location in order to refine further that user's location and/or to query the telemetry system to understand where the user is exactly positioned in a complex environment. Such systems and the telemetry services they provide often supplement GPS-based location observations, e.g., in indoor locations, and/or in locations where the devices may not receive satellite signals to be able to provide an accurate measurement of the device's location. Another example of a remote telemetry collection is a mobile application framework that assists application developers and advertisers with understanding the location, demographics, and behavior profiles of a particular application's users. Such a framework may collect wireless network observations and geospatial telemetry from mobile devices when permissible to build behavioral profiles of application users.

These techniques and the associations derived using one or more of these techniques can be beneficial to third parties analyzing/auditing a particular entity. Such third parties include security rating services. Specifically, these techniques and the derived entity-assert association(s) may allow a third party, i.e., a party non-privy to the semantics of the underlying network infrastructure at target organization to: (1) Discover IP addresses used by hosts connected to wireless systems within the context of a business of interest. More appropriately, these same IP addresses are generally used by other workstations within the organization and, as such, these associations allow for improved and extended uses of the entity maps; and/or (2) Discover the associated wireless infrastructure of an organization of interest, which may contain information about the security configuration of the discovered networks. The derived associations may be combined with other datasets that can provide additional metadata or other relevant metadata keyed from similar network infrastructure attributes (e.g., SSID, BSSID). This may also, for example, be useful when trying to provide additional context for other events associated with IP addresses, through such methods as labeling IP addresses with the associated wireless networks that exist within that network.

One of the goals of the aforementioned techniques is to catalog new associations between an entity and IP addresses or network infrastructure assets (e.g., SSID, BSSIDs) that are not currently present in a database, generally referred to as an entity management (EM) database. The associations may be monitored subsequently and one or more associations may be removed from the EM database, if it is determined that those association(s) are no longer observed. Another goal of these techniques is to discover new individual elements (e.g., SSIDs, BSSIDs, and/or IP addresses) based on the known or previously discovered elements.

In various embodiments, each of the techniques uses two distinct datasets: an EM dataset that associates entities with digital assets (IP addresses, metadata), and a wireless observations dataset such as those collected by vendors of geospatial positioning services, advertising networks, cybersecurity firms, telecommunications organizations, market research services, wireless technology surveyors, deployers of advertising beacons, vehicle navigation services, parental control/monitoring services, census organizations, etc. In the discussion below, the terms "wireless network observation" and "wireless network configuration" are used interchangeably and they refer to the types of events/datasets that are produced by the aforementioned services that may associate wireless networks with geolocations.

In general, for each technique, the first dataset that includes certain metadata and/or digital assets generally exists already, in order to extract value from the wireless observations dataset or other secondary dataset(s) that may carry wireless-related telemetry. The EM dataset may be stored digitally and/or may be known otherwise, as long as the associations between entity names or identifiers and digital assets of the respective entities are known and are discernable. An EM dataset is described in U.S. Pat. No. 9,830,569 B2, which is incorporated herein by reference, in its entirety. Another dataset, that may include metadata about organizations/entities or about IP addresses, may be discovered and incorporated into an embodiment of a system described herein. U.S. Pat. No. 9,438,615 B2, which is incorporated herein by reference, in its entirety, describes such a dataset. One or more of these datasets can be used to extract new information in various embodiments, as described herein.

In various embodiments, an entity-asset association system may operate as follows to discover new attributes/assets to be associated with an entity of interest: Per Technique 1, at least one operational name of the target company must be known. In addition, at least one physical location of the company may be available to help improve the quality of any derived association. Per Technique 2, at least one physical location of the target company or organization must be known. This may be in the form of a physical address, or a latitude, longitude pair. At least one operational name of the company may be available to help improve the quality of any derived association. Per Technique 3, at least one IP address must be known to be associated with a target company. At least one operational name of the company may be available to help improve the quality of any derived association. Alternatively or in addition, at least one physical location of the company may be available to help improve the quality of any derived association.

The secondary dataset that may be produced by one or more geospatial positioning services, generally has some or all of the elements (SSIDs, BSSIDs, and/or IP addresses) that are used by the above-described techniques. The dataset may also contain other information unknown to the entity-asset allocation system, where one or more of the above-described techniques can be used to extract such previously unknown information/assets and, then, the system can associate the newly discovered information/asserts with the rightful organization. For example, Technique 1 generally requires that the secondary dataset include SSIDs so as to be able to perform informed processing of those SSIDs using known metadata about an organization (e.g., the organizations name or doing-business-as name). The extracted value(s) from the secondary dataset may be in the form of the specific SSID(s) that the organization uses and/or owns. The extracted value(s) may also include the BSSID(s) owed/used by the organization. The extracted value(s) may further include the IP address(es) associated with the discovered SSID(s)/BSSID(s), that are owned/used by the organization. Specific configuration information about the SSID(s)/BSSID(s) owned/used by the organization may also be included in the extracted value(s). The secondary dataset may include only one of the aforementioned unknown elements that would make Technique 1 valuable to using that secondary dataset as a source for discovering entity-asset associations.

Figure 3:
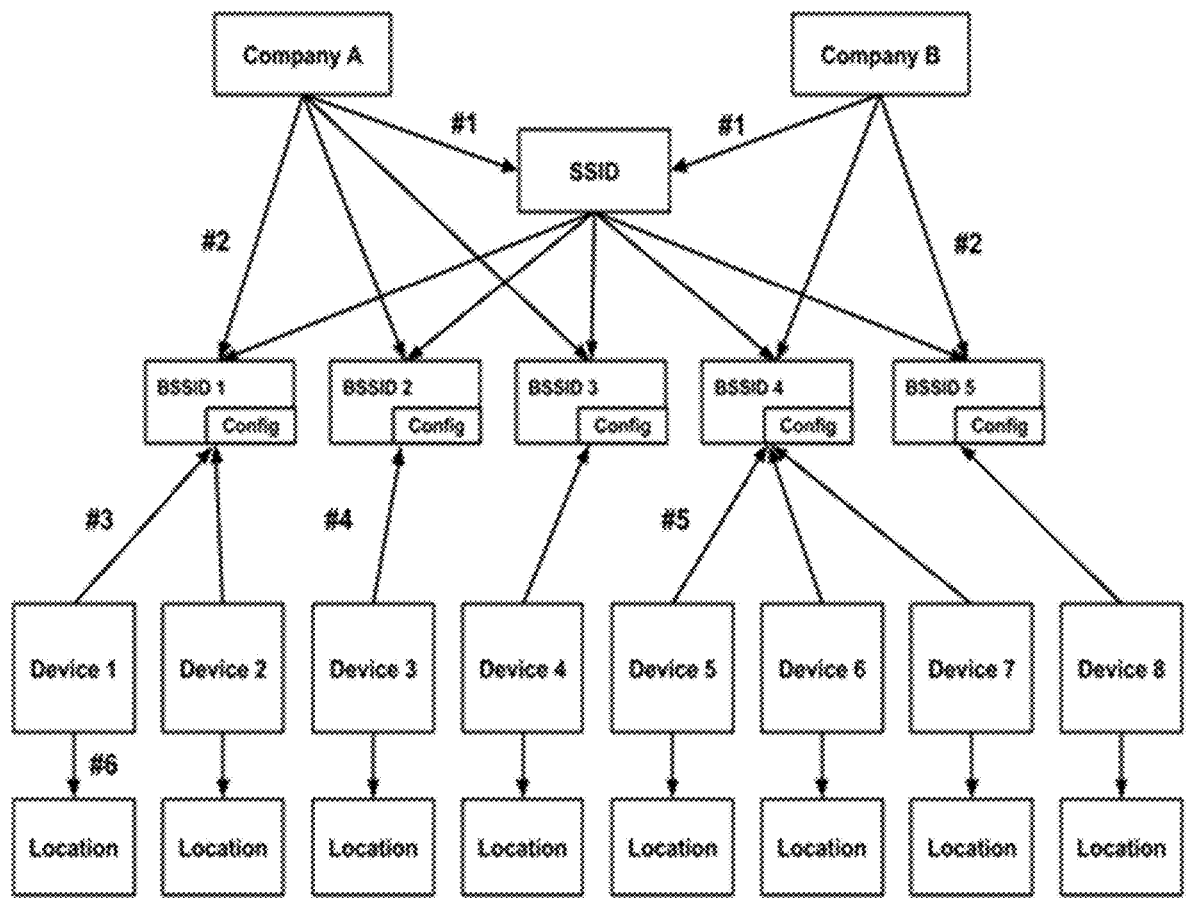
FIG. 3 schematically depicts a relationship between certain digital assets, entities, and user devices, where associations between entities and assets can be discovered according to various embodiments.

To illustrate, FIG. 3 shows the relationship between a subset of different elements within the secondary dataset, and describes some of the ambiguity that the techniques described above assist in resolving. In FIG. 3, a single SSID is assumed to exist, where the SSID may be identified by the name "First Bank." There may exist two companies that potentially use the same "First Bank" SSID, particularly if both companies happen to be named similarly and have the words or some variation of the words "First" and "Bank" in their respective names. Another example is the ubiquitous nature of the SSID "linksys," demonstrating that the SSIDs may not be unique per organization. In FIG. 3, Company A uses three access points, "BSSID 1" through "BSSID 3" while Company B uses "BSSID 4" and "BSSID 5" (#2).

An enterprise wireless deployment may likely involve more than one access point in order to provide the best RF coverage for a given physical space. As such, these access points may be configured to allow clients to seamlessly roam between them while operating on the same network. The underlying network stack of the client would generally handle the logistics and process of roaming between these access points as the user physically moves, or as the RF environment changes in a way that warrants a transition.

Each physical access point, represented as BSSID, e.g., in the form of a pseudo MAC address (which truly represents a physical or virtual interface on the access point) in some embodiments, has an associated SSID. Each access point also has a distinct configuration for the wireless network, which may be centrally managed using a wireless LAN controller or other form of management. The combination of a SSID and BSSID is generally assumed to be unique per organization. As such, the pair "SSID, BSSID 1" is different from the pair "SSID, BSSID 2" or the pair "SSID, BSSID 5". With only the information "SSID, BSSID 1" and "SSID, BSSID 5", an external observer may not know whether and which access points Company A uses/owns and which access points Company B uses/owns, even when that external observer knows that Company A and Company B use the same SSID.

One or more wireless devices (such as laptops, mobile devices, IoT devices, or any other devices that support wireless functionality) can be associated with any one of the BSSIDs. Each wireless device also has a distinct location. If a particular wireless device is a mobile device, the position may be dynamic, typically providing a rough estimation of the location of the person who owns or is using the device. Wireless IoT devices may be relatively more static than mobile devices, with desktops being the most physically fixed devices. These types of behaviors can be used potentially to classify the different types of devices the network supports. If some optional elements are included in the network observations, such as an identifier of the client, a more accurate representation of the physical network may be understood.

In the foregoing example, two devices are associated with "BSSID 1" (#3), one device is associated with "BSSID 2" (#4), and three other devices are connected to "BSSID 4" (#5). The devices connected to "BSSID 4" are connected to a network managed by Company B, while the devices connected to "BSSID 1" and to "BSSID 2" are connected to a network managed by Company A. Given these BSSIDs are associated with the same SSID, however, additional network observations characteristics are needed that can help with the disambiguation between a network associated with Company A and a network associated with Company B. Optionally included elements within the secondary dataset can help with this disambiguating. These optional elements (also called characteristics or attributes) include but are not limited to the IP address of the device at the time the observation was reported, the physical location of the device at the time the observation was reported, the device identifier, etc. How these additional elements may be used to reduce ambiguity is discussed below.

If the secondary dataset originated from a geospatial service, the data may be generated when a user interacts with a component or piece of software on the devices that is configured to collect certain information about the user and device at the time of the interaction. For example, when the user opens an application on a device, the application may report certain information to a service about the device, as well as the context of the request and the context of the use case. FIG. 4 shows example data points that the service may have collected from the device(s) during transactions with those device(s), and these data may be used to provide better services, such as more accurate positioning information without the need for accurate GPS signaling.

A geospatial service may provide certain information to the device, such as the location of the device. The device itself may also provide information regarding its location to the service without the knowledge of accuracy of the location, e.g., to obtain confirmation that the estimated location is correct. The information submitted may include all of or subsets of the information described earlier regarding e.g., SSIDs, BSSIDs, IP addresses, security configuration, etc. The process of collecting this information from devices or users under these interactions are known public methods and, and the dataset(s) generated using the collected information provide a basis for the operation of the entity-asset association techniques described herein.

Figure 5:
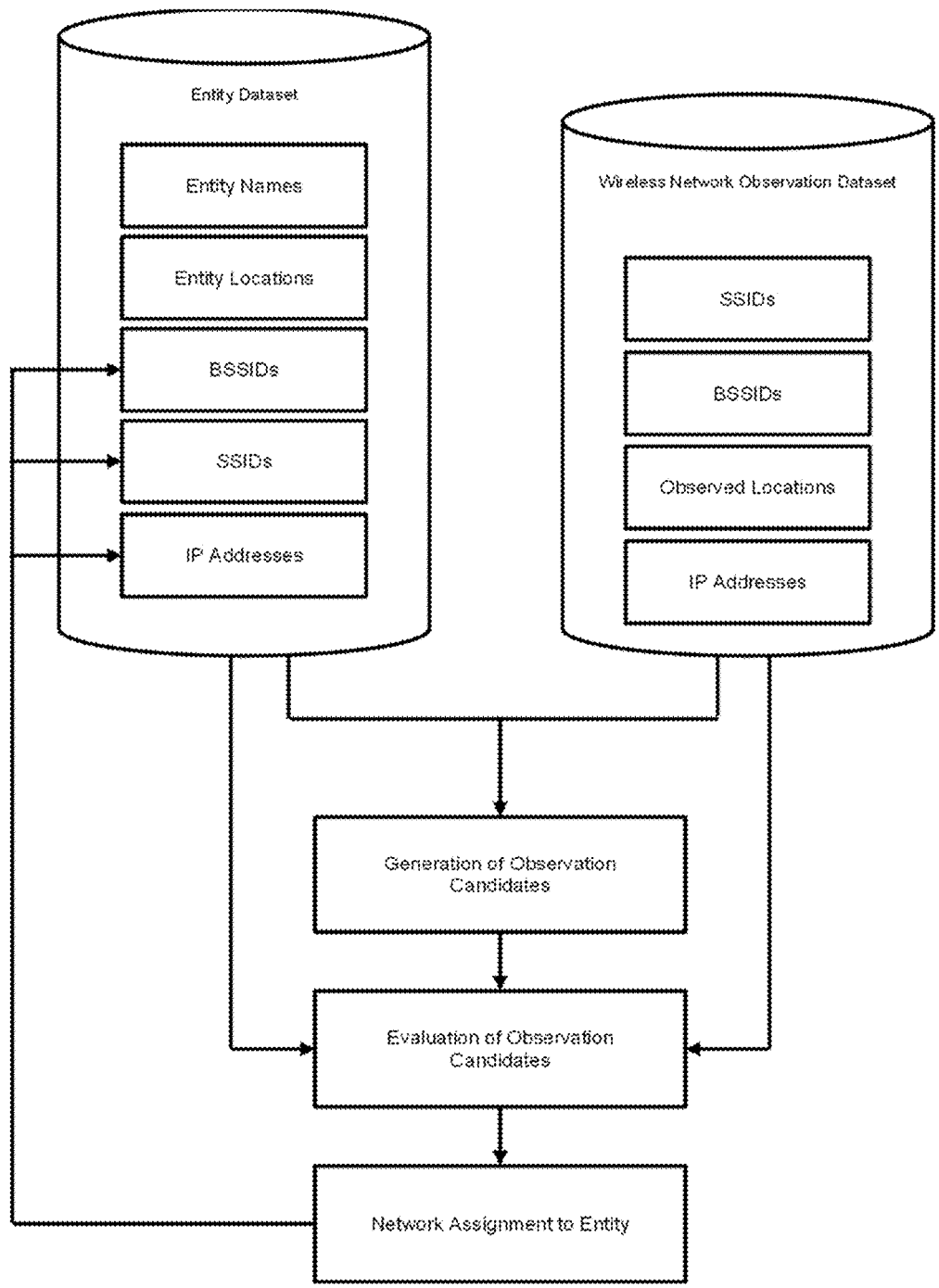
FIG. 5 schematically depicts a primary entity management dataset and a secondary network observations dataset, and processing of the information in these datasets, according to various embodiments.

FIG. 5 shows a general processing architecture of some embodiments of an entity-asset association system in which data pulled from an Entity Dataset and a Wireless Network Observations dataset are combined to identify potential network attribute mapping candidates. Generated candidates are then processed through an evaluation pipeline, and network attributes that pass the evaluation pipeline are attributed to their respective entities in the Entity Dataset. With both datasets available, the techniques summarized above and discussed further below can be used to discover new information about assets of organizations.

Technique 1—Discovery by Entity Name

Given an EM dataset that associates operational names to an entity, e.g., using one or more firmographic data sources, Technique 1 relies on the tendency of organizations to name their SSIDs in such a way that makes the SSIDs easily recognizable to the users of the wireless network. This allows for the discovery of candidate events in a wireless observations dataset via similarity comparisons of various transformations of the name of an organization of interest and the SSIDs present in the wireless observations dataset. In one example, an organization may include part of its name in their wireless SSIDs such that "Acme Corporation" may deploy a SSID named "Acme-Secure." Organizations may also deploy SSIDs that contain acronyms or other abbreviations such that "First Bank" may have an SSID called "FBank." Through enumeration of common name transformations, events from the wireless observation dataset can be retrieved either: 1) by directly querying the wireless observation dataset SSIDs for transformations of the organization name, or 2) by prioritizing wireless observation results based on the application of a scoring function to the organization name and SSID. The scoring function can be generated from hand-crafted rules, or generated programmatically by deriving a statistical model from known organization name to SSID mappings.

Figure 6:
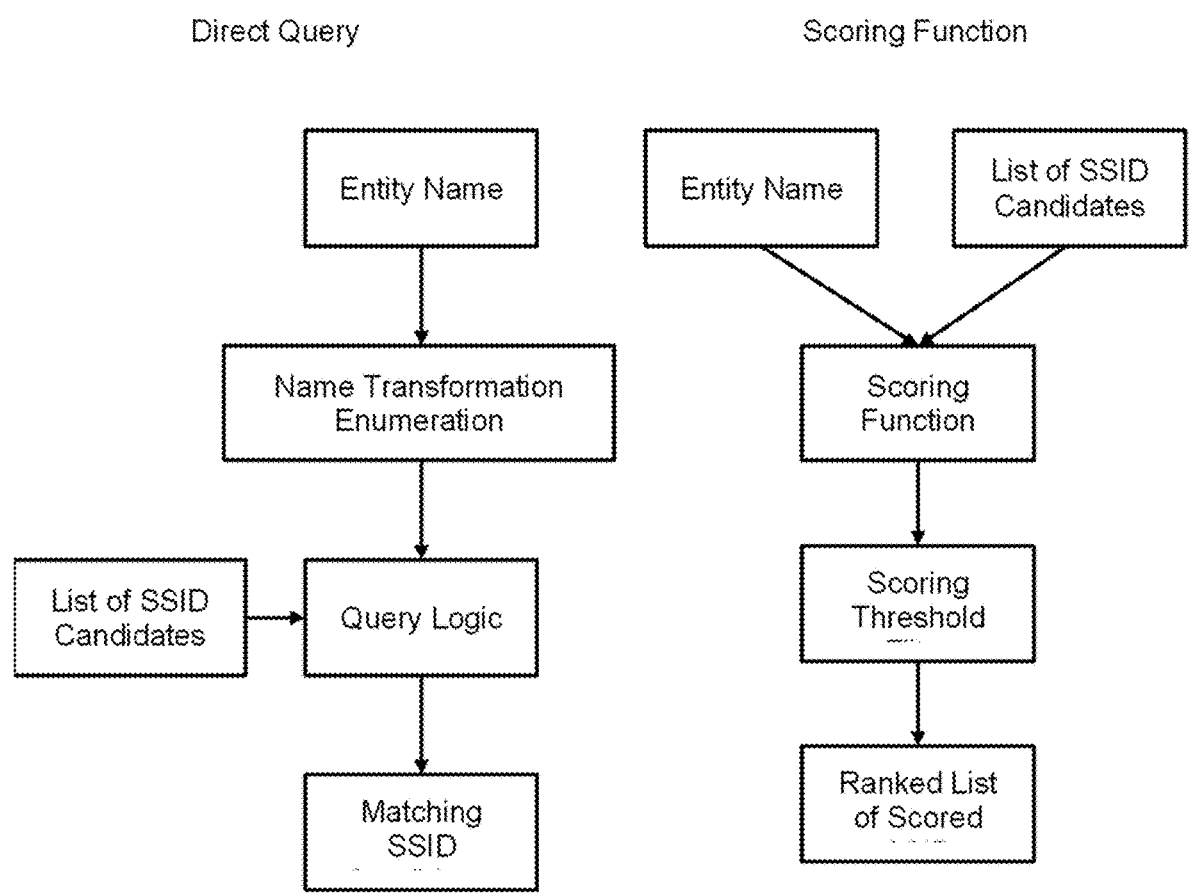
FIG. 6 shows two processes of discovering SSIDs associated with an entity, according to two different embodiments.

With reference to FIG. 6, in some embodiments, the entity-asset association system implements Technique 1 starting with an entity name, or a series of entity names, originating from an entity management system and/or one or more firmographic data sources. In the case of a direct query, the entity name may be decomposed into multiple query terms and each term may be queried against the SSID values present in the network observations dataset. Records that match the query terms are returned and processed for further evaluation. The SSIDs in the matching records may be associated with the entity analyzed. In cases where a scoring function is used, each SSID value and the entity name are input into the scoring function, producing a score value for each record. Records with a score exceeding a given threshold are returned, e.g., in a descending sorted order by their score, and these records may be processed for further evaluation. The SSIDs in the records that meet the selection threshold may be associated with the entity analyzed.

Figure 7:
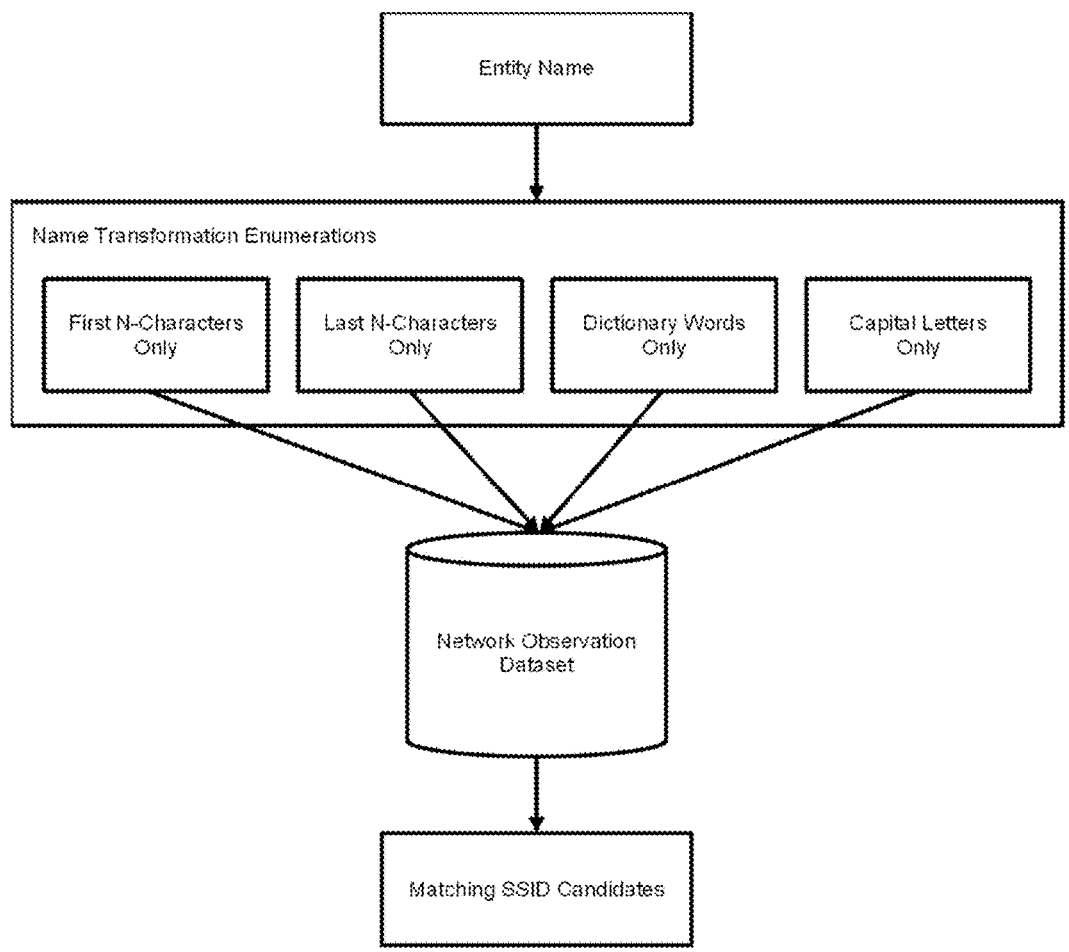
FIG. 7 shows certain aspects of the processes shown in FIG. 6.

For example, with reference to FIG. 7, an entity name of "First Direct Bank" may be decomposed into multiple transformations such as "FD", "FDB", "First", or "Bank", which could successfully query and retrieve the SSID "FD-Bank" from the network observations dataset or be used as input into a scoring function that may highly rank the observation that includes the SSID "FD-Bank" as a potential network observation candidate for evaluation. Once a set of network observation records has been retrieved, numerous conditions may prevent a number of the candidate records from containing legitimate network attributes of the queried entity, including but not limited to: 1) entity name similarity across entities, 2) entity name transformation similarity across entities, 3) overly broad query transformation terms, 4) SSID values that mimic other entity names, etc. As such, after the candidates have been generated, they may be filtered and evaluated to address the aforementioned error cases as well as other sources of ambiguity described under the heading Sources of Network Attribution Assignment Ambiguity. The filtering and evaluation techniques utilized are described under the heading Techniques for Filtering and Evaluation of Mapping Candidates.

Technique 2—Discovery by Entity Location

Given an EM dataset that associates either physical addresses or geospatial coordinates to an entity, obtained either through manual research, programmatic processes, or other firmographic data sources; method 2 relies on the presence of device geolocation information present within wireless network observation datasets. In some datasets, the geolocation may be of a device reporting an observation of a wireless network and in others, it may be the triangulation of the wireless network access point. In many cases, a metric of the precision of the geolocation is known and provided as a Horizontal Positioning Estimate (HPE) value which can be used to filter observations that lack the precision to be useful for attribution to an entity's physical location. Through a Colocation Metric wireless access points potentially belonging to an entity are discovered when an entity location present within the EM dataset is colocated with a location in the wireless observation dataset.

Figure 8:
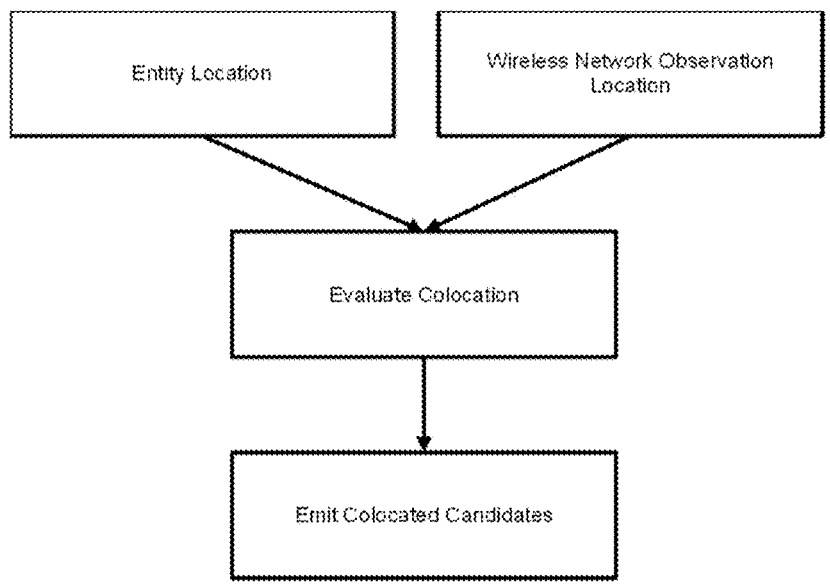
FIG. 8 shows a process of discovering assets using location information about entities, according to some embodiments.

With reference to FIG. 8, in some embodiments, the system implements Method 2 starting with an entity location, or a series of entity locations, originating from an entity management system, a firmographic data source, or manual research. The system queries the latitude and longitude values present in the wireless network observation dataset and returns records with latitude and longitude values within a distance threshold defined by the Colocation Metric. The returned records are further processed for further evaluation.

FIG. 8 shows an embodiments of a data processing architecture for the entity location discovery technique in which entity location data and wireless network observation locations are evaluated for colocation. Events that are determined to be colocated are emitted for further evaluation and processing.

Colocation Metric

In order to either 1) generate a potential candidate attribution or 2) validate on the basis of physical proximity a candidate generated through another technique, three approaches can be used to ascertain whether a wireless network observation event is colocated with an entity location. These are: (1) A continuous distance metric: such as a haversine or euclidean distance calculation considering the geolocation coordinates of the entity location(s) in question and the wireless observation event(s); (2) A discrete distance metric: such as comparing the result of a geohashing algorithm applied to the entity location(s) and the wireless observation event location(s); and (3) A human intelligence task involving visual verification of colocation when the entity location(s) and the wireless geospatial event location(s) are plotted on a static or interactive mapping interface.

Depending on the physical characteristics of the real estate owned by the entity, the colocation criteria will vary with larger distances accepted for entities with a large physical footprint such as a warehouse, a shipping/logistics hub, a large retail store, or a corporate business park. More strict colocation criteria are used for smaller entity footprints such as an office building or small storefront. In the case of Method #2, this metric is used to generate potential candidate records and in the cases of Method #1 and Method #3, it is used as evidence to corroborate or contradict candidate records.

Figure 9:
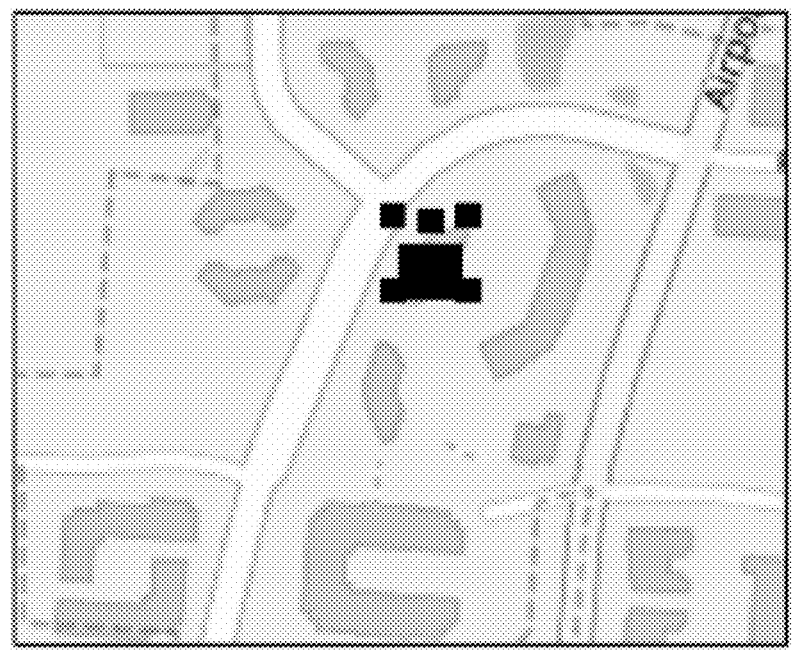
FIG. 9 is a visualization of colocated entities and devices that are using certain observed assets that may be associated with the entities, according to some embodiments.

FIG. 9 shows an example static mapping interface under which geolocation of wireless network observation events can be visually evaluated for colocation with an entity location of interest. Wireless network observation events within the colocation metric threshold are emitted as network attribute mapping candidates for subsequent filtering and evaluation. These network attributes can include SSIDs and/or BSSIDs, where the system may infer that the observed SSIDs/BSSIDs are associated with the business associated with the physical location. The attributes may also include IP address(es) observed in association with the observed SSIDs/BSSIDs and/or IP addresses assigned to mobile devices, where the system may infer that the IP address(es) are associated with the business associated with the physical location. Physical proximity alone is generally insufficient evidence to attribute an access point to an entity, and additional validation steps may be required to exclude erroneous associations such as: 1) multistory buildings in which an access point may operate from a floor not owned/used by the entity, 2) erroneous or outlying geolocation measurements, 3) imprecise geolocation measurement, 4) reporting device location differs substantially from observed access point location. In various embodiments, after the candidates have been generated, they are filtered and evaluated to address the aforementioned error cases as well as other sources of ambiguity described under the sub-heading Sources of Network Attribution Assignment Ambiguity. The filtering and evaluation techniques utilized are described under the sub-heading Techniques for Filtering and Evaluation of Mapping Candidates.

Technique 3—Discovery by Entity IP Address

Given an EM dataset that associates IP addresses to an entity, Technique 3 generates candidate wireless network observations when an entity IP address present in the EM dataset matches with an IP address present in the wireless observation dataset. This technique typically, though not necessarily, produces higher reliability candidates than Techniques 1 and 2. Subsequent filtering and evaluation steps may nevertheless be employed to exclude erroneous network attributions caused by, for example: 1) IP address sharing across organizations 2), virtual private networks, 3) mobile network gateways, and/or other conditions. The generated candidates may be filtered and evaluated to address the aforementioned error cases as well as other sources of ambiguity described under the heading Sources of Network Attribution Assignment Ambiguity. The filtering and evaluation techniques utilized are described under the heading Techniques for Filtering and Evaluation of Mapping Candidates.

Figure 10:
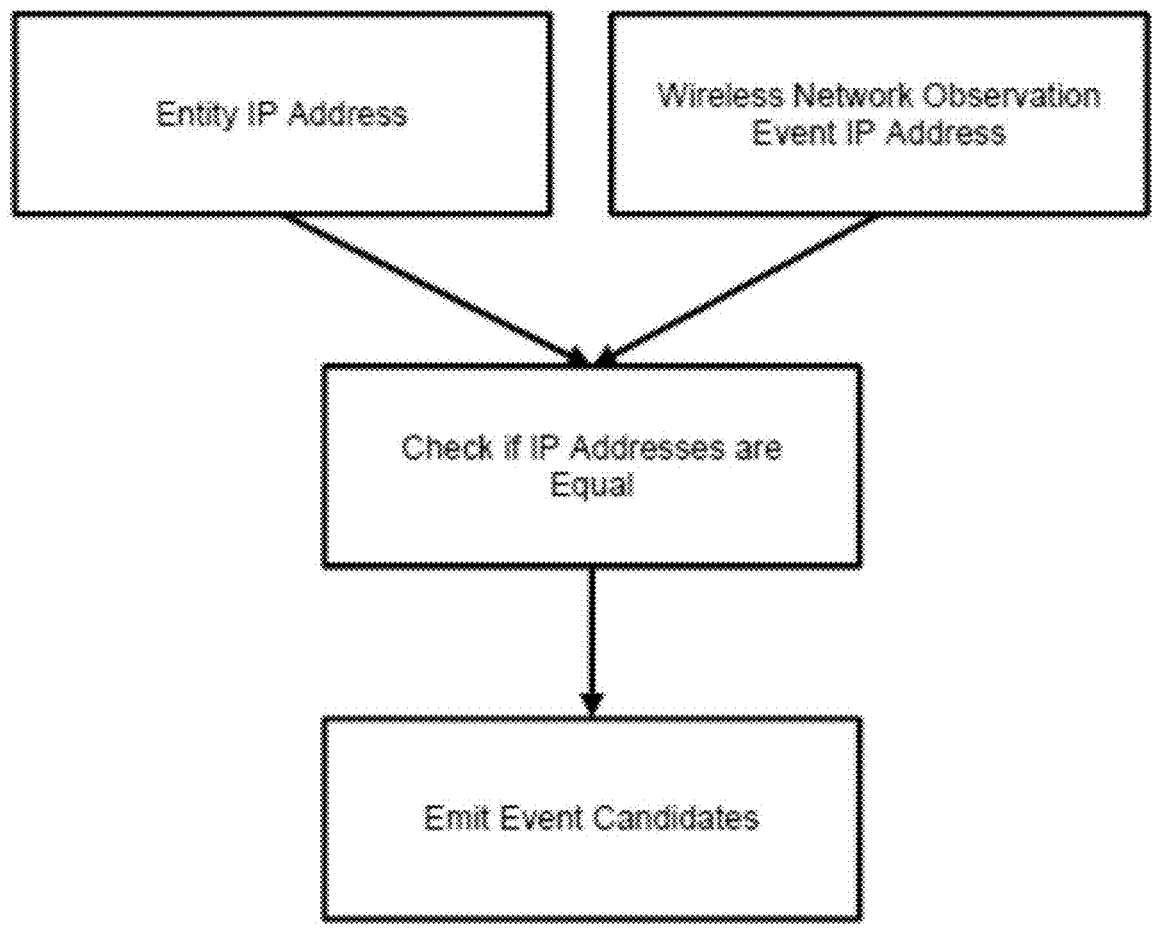
FIG. 10 shows a process of discovering assets using IP address(es) known to be associated with entities, according to some embodiments.

FIG. 10 shows a data processing architecture for event candidate discovery by IP address. IP addresses from the entity dataset and the wireless network observations dataset are checked for equality. IP addresses that appear in both datasets are emitted as potential mapping candidates are processed for further evaluation. Such observations may include SSIDs or BSSIDs, where the system may infer that the observed SSIDs/BSSIDs are associated with the business associated with the IP address that was found in both datasets. The observations may also include geolocations/physical addresses of devices that provided the wireless observations, where the system may infer that the physical addresses are associated with the business associated with the IP address that was found in both datasets. In general, all associations are candidates and any attribute from the original telemetry set can be associated to an organization using the IP address as the reference.

Various embodiments of the entity-asset association system implements Technique 3 starting with an entity IP address, or a series of entity IP addresses, originating from an entity management subsystem. The system queries the network observation dataset for the presence of the IP address and returns records that contain the same IP address. These records are further processed for evaluation, as described above.

Sources of Network Attribution Assignment Ambiguity

Several circumstances may prevent the direct application of the aforementioned discovery strategies from being a robust solution for the assignment of network attributions to entities, i.e., for establishing an association between an entity and digital assets. These circumstances include, but are not limited to:

Ephemeral Nature of Network Attributes

The lifetime of an IP address assignment is typically a configurable property determined by the Internet Service Provider and this configuration information is not generally available to a third party. Network access points can also be sold, replaced, removed, or discontinued from service. Therefore, a simple static mapping based on an observation can be insufficient for a robust attribution of network attributes to entities. As such, some embodiments of a robust assignment system (i.e., the entity-asset association system) continuously discovers, refreshes, and ages-off network assets that are attributed to or associated with one or more entities.

Erroneous Reporting of Network Configuration Information

A network observations dataset often suffers from a unique problem considering the semantics and processes using which mobile devices generally determine whether they are connected to a wireless network or not. There are many instances in modern mobile operating systems that can simultaneously activate a wireless network interface in tandem with the cellular network to a point that upper-level applications do not have a means to differentiate clearly between the network interfaces from which a packet will egress. For example, when an application on a given a mobile device that is currently connected a wireless network wants to send a packet, that packet may exit via the devices wireless interface, or it may exit via the cellular interface, even though the application may be designed only to send packets when it is connected to a wireless network. The receiving host of this packet may not have the ability to disambiguate at the time the packet is received and processed to understand which interface was used on the mobile device, without further inspecting the data payload and making an educated guess about the likely egress interface, e.g., based on the IP addresses and/or other metadata. When such a device contributes data to a network observations dataset, the IP address of a cellular network gateway may be erroneously attributed to a WiFi network to which the device is connected.

Virtual Private Networks

When an entity's IP address is used to discover potential wireless networks belonging to the entity, an error case arises when the device contributing the network observation is connected through a virtual private network in which case the wireless access point used by the client may not have a direct affiliation with the public IP address reported by the device. The public IP address reported by the device may be an IP address belonging to the employer. An example of this scenario is a user who works from home using his/her home wireless network, but connects to the employer's virtual private network. In such a circumstance, it would not be desirable to attribute the employee's home network with the employer entity as would be suggested by the network observation record.

Network Attribute Sharing Across Entities

In some circumstances, a network attribute may be shared across multiple entities. An example of this is when an Internet Service Provider performs network address translation and shares a single common public IP address for a large number of subscribers. Since the IP address is potentially shared across many individual entities, it is not appropriate to attribute the IP address to any specific entity for the purpose of attributing events involving the IP address to that entity. Filtering techniques may be applied to prevent such mappings during candidate evaluation.

Nonuniqueness of BSSIDs and SSIDs

While a BSSID is generally designed to be a globally unique identifier for a wireless access point, in practice, BSSID values can be duplicated across devices and there is no guarantee that a BSSID, SSID pair uniquely identifies a single hardware device. A system assigning network attributes to entities on the bases of network observation telemetry may therefore identify when a BSSID, SSID combination is not unique to an entity and may prevent network attribute assignment in such circumstances.

Low Resolution in Geospatial Measurement

Leveraging the geospatial coordinates reported by network observations datasets poses, in some cases, numerous challenges to determining physical colocation due to the poor resolution of the measurement, a first artifact, as well as other factors. Even when a horizontal position error (HPE) value is known, the topology of the potential actual geolocation may not align with the physical topology of a structure that is associated with an entity and to which the event is being considered for attribution. This can introduce ambiguity when attempting to attribute the event to the entity. A second artifact of wireless network observations datasets can also introduce ambiguity, in that typically the geolocation provided by the dataset is of the device observing the wireless network, not the triangulated position of the actual wireless network or the access point. A third artifact is that the wireless observations datasets typically do not include altitude information for the observations, which can make it infeasible to determine from which floor a wireless network may be broadcasting in a multistory building. This can introduce an ambiguity when multiple entities may own, lease, or operate from different floors of a building. Due to these sources of ambiguity, geospatial location information from a network observations dataset can be insufficient to associate in a robust manner a network attributes to entities. In various embodiments, the geospatial location information is nevertheless used to discover potential attribution candidates and to reinforce attribution evidence from other sources such as those described herein.

FIG. 11 demonstrates some sources of ambiguity where additional validation steps may be needed prior to associating network attributes with entities, where the association is based strictly on colocation criteria. The observed location of a wireless access point may differ substantially from the actual location either due to the imprecision in the measurement or due to the distance between the observing device and the observed wireless access point.

Figure 12:
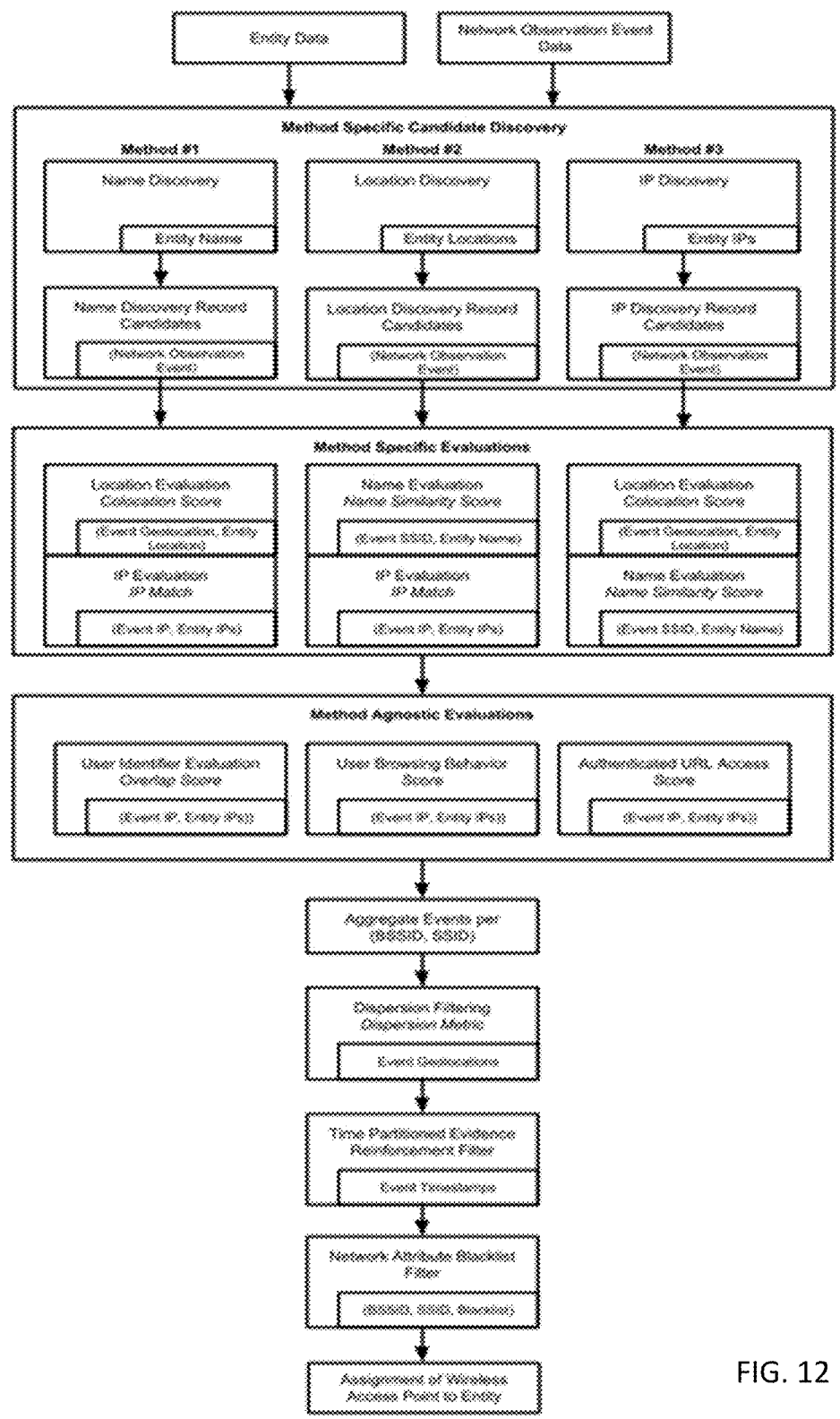
FIG. 12 shows an overall evaluation and filtering process for evaluating network observations, according to some embodiments.

FIG. 12 demonstrates an example processing pipeline for the association of network attributes to entities based on a combination of entity data and wireless network observations data used in the techniques described above.

Techniques for Filtering and Evaluation of Mapping Candidates

In some embodiments, one or more of the several techniques described herein are applied to mitigate the magnitude of the previously discussed sources of ambiguity, and to increase the robustness of the EM datasets based mapping of network attributes to entities. These techniques include, but are not limited to:

Time Partitioned Evidence Reinforcement Criterion

One technique for removing multiple erroneous or outlying data is to implement a reinforcement criterion which necessitates multiple observations of supporting evidence across discrete partitions of time. The number of repeated observations must exceed a given threshold before making a network attribute assignment to an entity based on the observations. This technique can address the challenges that arise in circumstances where the sampling rate of the network observations dataset is unknown, and/or where the data points in the dataset lacks unique identifiers for reporting devices, where such identifiers can allow for event deduplication.

For example, a single device reporting three duplicate network observations possibly cannot be discriminated from three separate devices reporting the same network observation. It is desirable to discriminate these two scenarios as three devices reporting a network observation can be interpreted as stronger evidence for the observation than a single device reporting the same event multiple times. The single device evidence is arguably even weaker if all events occur at roughly the same time. In such circumstances, discrete partitions of time can be used as a deduplication key, and the reinforcement criterion may be implemented as a threshold of distinct time partitions in which instances of a particular attribution observation, or set of related attribution observations, must be observed prior to performing the assignment (i.e., prior to associating one or more assets represented by the observation(s) with an entity of interest). The inclusion of a longer age-off window can ensure that stale, outlying observations are removed from consideration, and resets the observance criteria. In particular, an observation is removed from consideration when the time since the last instance of that observation exceeds an age-off threshold, which can be parameterized.

Figure 13:
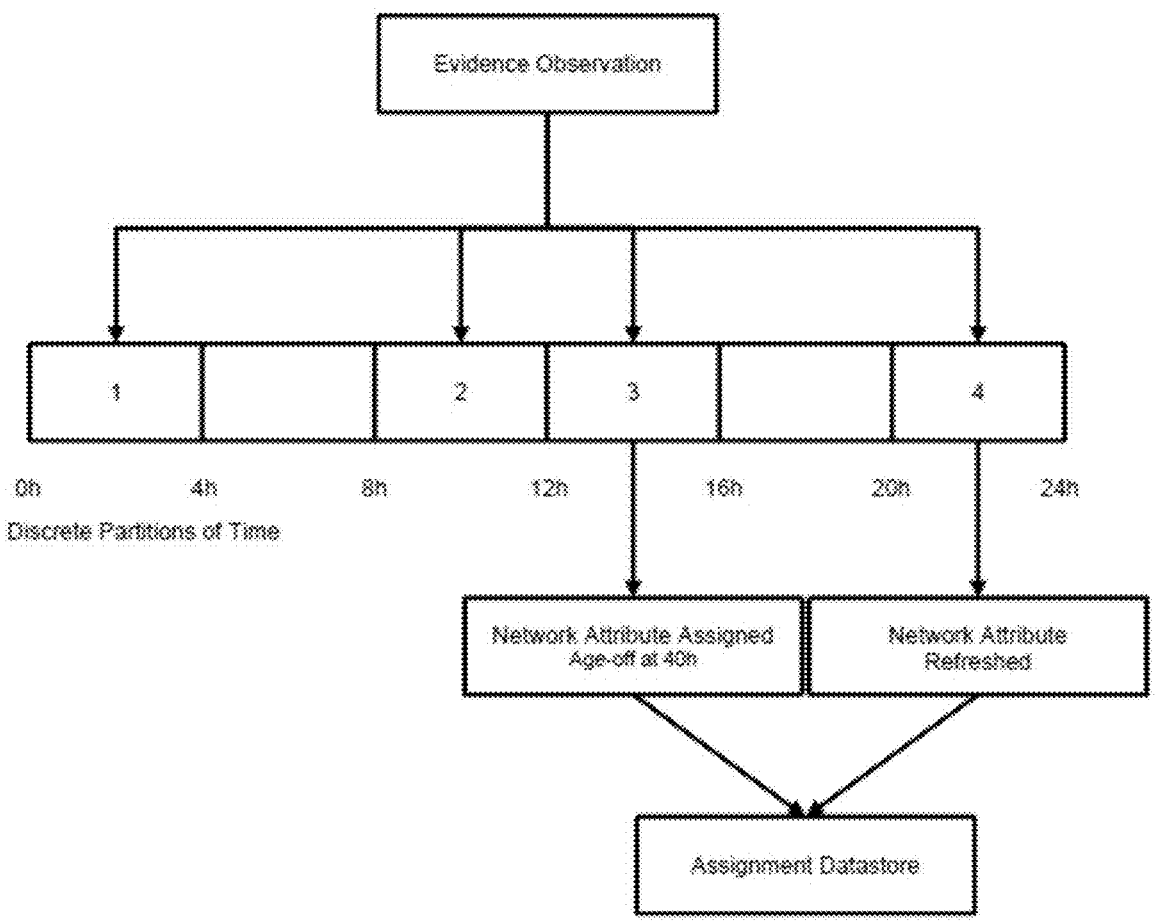
FIG. 13 illustrates via an example an evaluation and filtering process that analyzes time of network observations for evaluation thereof, according to some embodiments.

To illustrate, with reference to FIG. 13, if an age-off window is 24 hours, and an instance of a particular observation is not observed a 5th time by hour 48, the network attribute assignment may be aged off, and the observation instance counter may be reset to zero for that observation. Such a scheme can greatly reduce the impact of singular errors or outlying data points in the network observations dataset and provides a mechanism to discover, refresh, and age-off network attribute assignments that may no longer be relevant.

Geospatial Dispersion Metric Filtering

In some cases, a wireless access point may service a large area such that it cannot be attributed to a single organization within the observed geolocations of the wireless access point. Such instances can occur when a BSSID and SSID are shared across access points, when erroneous or imprecise geolocation information is reported by a device, and/or when an access point simply services a large geographic area. To prevent the attribution of access points servicing a large area to an entity that represents only a portion of the service area, an aggregation is computed in the network observations dataset when grouped by unique BSSID, SSID fields. This aggregation calculates a geospatial dispersion metric which may include a calculation of the interquartile range, the range, the median absolute difference, the coefficient of variation, the quartile coefficient of dispersion, and/or other metric(s) of variance incorporating the geospatial coordinates provided by the network observations dataset. Access points, identified as a unique BSSID, SSID pair, that have a dispersion metric larger than a given threshold may be filtered and not attributed to entities as the service area of those access points is likely broader than the physical space associated with the entity of interest. The dispersion threshold can be a static value or a value generated by incorporating characteristics of the entity, to account for varying entity geospatial footprint sizes.

Figure 14:
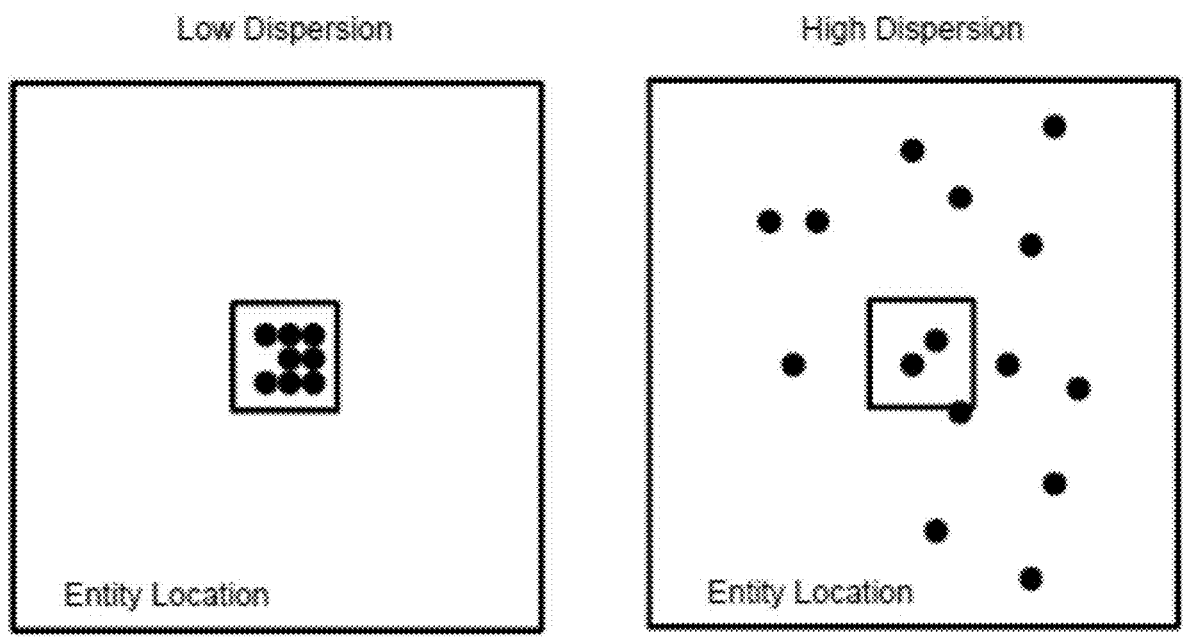
FIG. 14 illustrates via an example an evaluation and filtering process that analyzes spatial distribution of network observations for evaluation thereof, according to some embodiments.

FIG. 14 shows a desirable geospatial dispersion on the left and an undesirable geospatial dispersion on the right. The observation events corresponding to the pattern on the right may be filtered out, since the assets represented by these observation events cannot be attributed solely to the location of the entity of interest.

High Volume Network Attribute Blacklisting

Various embodiments of the entity-asset association system described herein rely on the semi-uniqueness of SSIDs, BSSIDs, and IP addresses. In some circumstances, particular SSID, BSSID, and IP address values may be observed in wireless network observations datasets at a very high volume that can disrupt the filtering and evaluation techniques described herein. One such example is a SSID representing a WiFi hotspot for a major telecommunications company for which tens of thousands of access points exist. In another case, when an IP address is shared across all subscribers of a particular internet service provider gateway, all the wireless access points present on the ISP network may appear to share a single IP address in a wireless network observations dataset. When observation counts are used as a technique for evaluating attribution observations, very high volume events such as the aforementioned examples may erroneously manifest as "strong evidence" for attribution to an entity, simply due to the volume of observations. For this reason, a blacklist of network attributes covering high volume attributes may be maintained, and applied to network attribute mapping candidates.

Associative Evidence of IP Address User Identifier Overlap

Figure 15:
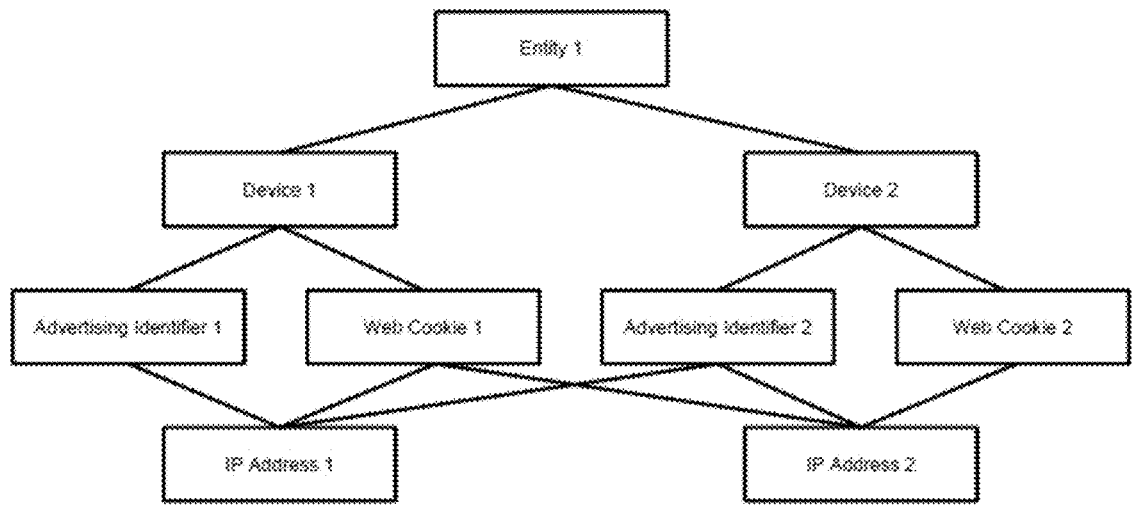
FIG. 15 schematically depicts potential relationships between digital assets, entities, user devices, and user identifiers, using which associations between entities and assets can be discovered according to various embodiments.

FIG. 15 shows potential relationships that can exist between entities, devices, user identifiers, and IP addresses. The presence of such relationships can be leveraged as supporting evidence for the association between two IP addresses when the IP addresses are observed with common user identifiers.

Internet services generally assign unique identifiers to users for a variety of purposes. Examples of these identifiers include web cookies used to track user sessions and preferences and advertising identifiers used for the tracking and deployment of advertisements. When a dataset provides associations between IP addresses and unique user identifiers such as web cookies or advertising identifiers, a metric of similarity may be assigned to two or more IP addresses, based on the unique user identifiers that are observed to be associated with those IP addresses. If the same unique user identifiers are observed on two or more distinct IP addresses, it is likely that the same user was active on those IP addresses. Such an observation reveals a potential relationship between the IP addresses and increases the likelihood that they are owned or operated by the same entity, compared to IP addresses that are not associated with any common user identifiers.

Figure 16:
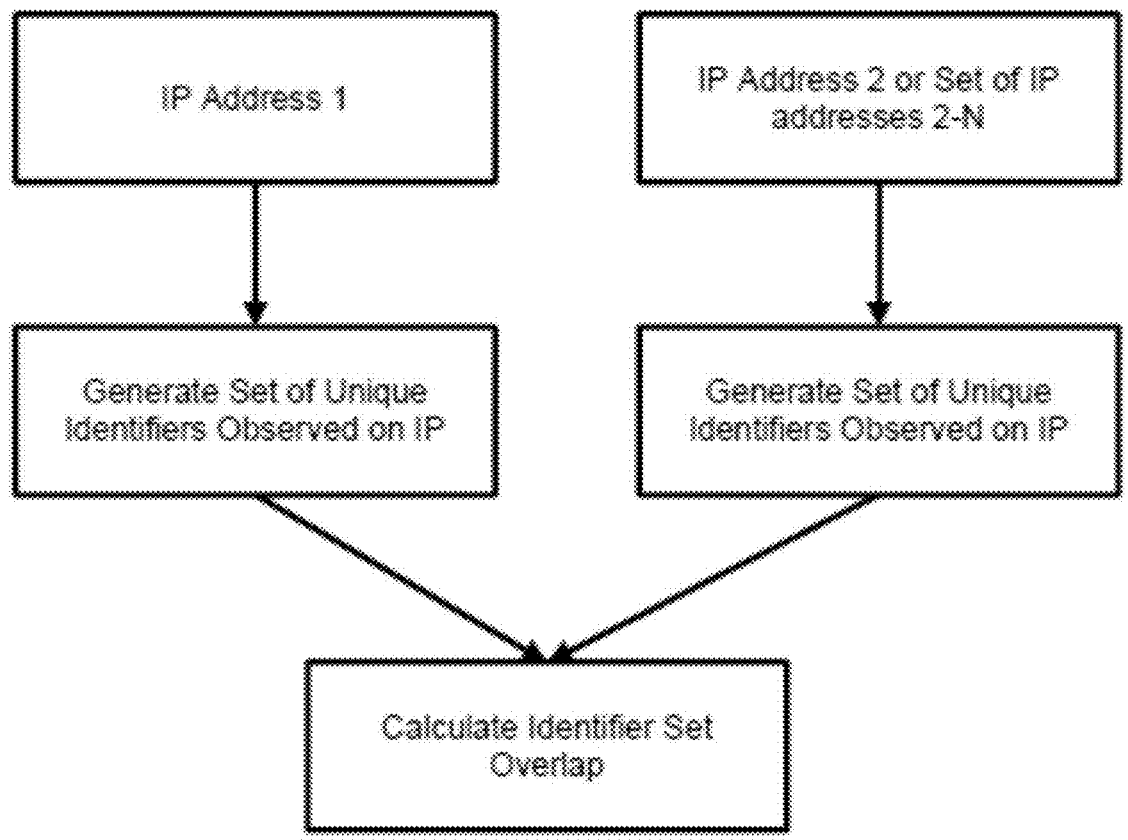
FIG. 16 shows a process of discovering and/or evaluating using user identifiers the IP addresses that are potentially associated with an entity, according to some embodiments.

With reference to FIG. 16, the strength of a relationship between a pair of IP addresses can be evaluated based on observations of unique user identifiers. First, sets of unique user identifiers are generated for each IP address. Thereafter, the cardinality of the intersection of the two sets is calculated, and is divided by the cardinality of the union of the two sets. This ratio is known as the Jaccard index. For example, if IP Address 1 is observed with unique user identifiers A and B, and IP Address 2 is observed with unique user identifiers B and C, the relationship metric will be ⅓ because the intersection of the two sets contains a single element {B}, and the union of the sets contains the three elements {A, B, C}. This metric can then be used as evidence when evaluating if an IP address, or other network attribute attributable to an IP address, should be assigned to an entity as it is expected that unrelated IP addresses will have a Jaccard index of 0 and IP addresses servicing the same user base may have a Jaccard index greater than 0.

Associative Evidence of IP User Browsing Behavior

Additional evidence supporting the association of a network attribute (asset) with an entity can be derived from datasets that provide associations between IP addresses and the web resources that have recoded those IP addresses as IP addresses of visitors. Such datasets may be generated by web server logs, content delivery networks, advertising networks, and/or third party services incorporated into a website. Supporting evidence is based on the phenomenon that typically the most frequent and persistent users of a website can often be attributed to members of the organization that own and/or operate the website. If an entity management dataset is available that attributes website domain names to entities, the frequency of observations of an IP address corresponding to the visitors visiting the website domains belonging to a given entity can be used as an indicator that those IP addresses are potentially associated with the entities to which the visited domains belong.

Given a website log dataset and an entity management dataset, in some embodiments, the entity-asset association system scans website log events for hosts or domain names that are present within the entity management dataset. Records that contain known entity host/domain names are aggregated such that the number of times each IP address was observed with a known entity host/domain is counted. The IP addresses are then indexed and stored in such a way that they are easily retrievable, facilitating a query that yields the IP address that may be associated with a specified entity. The counts of observations may be used as enriching evidence.

With reference to FIG. 17, which shows an example website log dataset that provides associations between a client IP accessing a resource, the host of the resource, and the URL of the accessed resource, as well as an entity management dataset that maps domain names to entities, association may be derived from the fact that an IP addresses is observed accessing a website mapped to a known entity. In particular, these datasets provide evidence that the IP address 192.0.2.125 may be attributable to the entity "First Bank, Inc." The datasets provide a stronger evidence that the IP address 203.0.113.241 may be attributable to the entity "Acme Corp." because multiple records that support this association are found in the datasets.

When IP addresses or other wireless network attributes with a known IP address association are being evaluated for attribution to an entity, a matching user browsing behavior entity association may be used as reinforcing evidence for that attribution.

Associative Evidence of IP Authenticated URL Access

Another technique that that uses datasets providing associations between IP addresses and the web resources and that can further support a derived entity-asset association exploits knowledge of the uniform resource locator (URL) patterns for authenticated web services such as the administrative page of a website or blog which enables editing of the site's content. If the domain of the website can be attributed to a given entity, and the universal resource locator string can be attributed to a known application that requires authentication prior to access, it can be assumed that the IP address allocated to a device visiting the URL is likely used by an authenticated user of the resource, who is likely a member of the organization operating the website or service. As such, the IP address allocated to the user device may be an asset of the organization.

Given a website log dataset, an entity management dataset, and a authenticated URL knowledge base, in some embodiments, the entity-asset association system scans website log events and filters out those records that contain a URL known to require authentication as identified in the authenticated URL knowledge base. The filtered records are then scanned by the system for hosts or domain names that are present within the entity management dataset. Records that contain known entity host/domain names are aggregated such that the number of times each IP address was observed with a known entity host/domain is counted. The IP addresses are then indexed and stored in such a way that they are easily retrievable, facilitating a query that yields the IP address that may be associated with a specified entity. The counts of observations may be used as enriching evidence.

With reference to FIG. 18, that shows an example website log dataset, an embodiments of an entity-asset association system determines that there is strong evidence that the IP address 192.0.2.125 is associated with "First Bank, Inc." The reason is, the URL resource where this IP address was recorded is known to require authentication for access according to the Authenticated URL Knowledge Base dataset.

When IP addresses or other wireless network attributes with a known IP address association are being evaluated for attribution to an entity, a matching authenticated URL access entity association may be used as as reinforcing evidence for the attribution.

Discovery of New Elements and Expiry of Existing Associations

Figure 19:
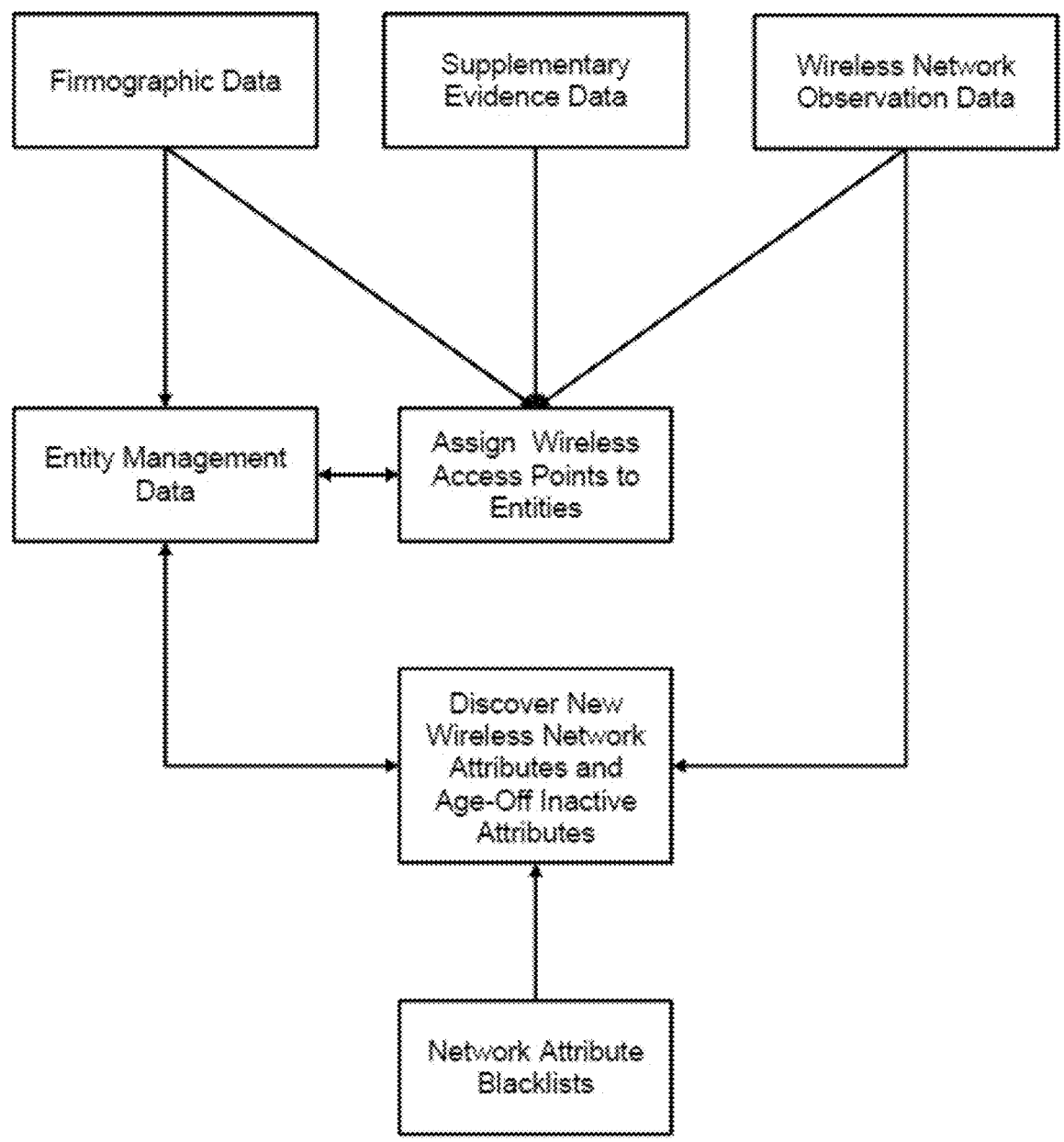
FIG. 19 schematically depicts on-going evaluation of various datasets for discovering new assets, and for updating previously discovered entity-asset associations, according to some embodiments.

FIG. 19 shows the relationship between the initial network assignment process and the element discovery and expiry process which relies on the same datasets. While the discovery of wireless access points and IP addresses based on an organization name or a geolocational reference may employ a robust filtering and evaluation, once at least one set of SSID, BSSID pairs is associated with an organization using one or more of the above-described techniques, another procedure can further analyze the wireless observations dataset to find additional information, such as more IP addresses or other wireless networks. The procedure may also continually monitor the datasets so as to update or change the previously derived associations.

Any two of the three tangible assets ("SSID", "BSSID", and "IP Address") can be used to find missing or unknown third elements and the association of the newly discovered element with an entity of interest can be determined using one or more techniques described above. The filtering techniques described above may be applied while identifying the additional elements and/or in determining their associations with entities.

With reference to FIG. 20, in an example wireless network observations dataset that provides associations between an IP address, a latitude, a longitude, a BSSID, and a SSID, the following example network attribution discoveries could be made. If the BSSID "a2e4d20fb96b" and the SSID "FirstBank-Wifi" are assigned to a particular entity, the IP address "192.0.2.125" can be discovered and evaluated for association with the same entity based on the first record. Similarly, if the IP address "192.0.2.125" and the SSID "FirstBank-Wifi" are associated with an entity, the BSSID "a2e4d20fb96b" may be discovered and evaluated for association with the same entity. Finally, if the IP address "192.0.2.125" and BSSID "a2e4d20fb96b" are attributed to an entity, the SSID "FirstBank-Wifi" may be discovered and evaluated for association with the same entity.

In some embodiments, network attributes discovered through this procedure may be tracked and associated with respective entities according to the Time Partitioned Evidence Reinforcement Criterion and implemented as follows. An embodiment of the entity-asset association system relies on three parameters, a time partition length (a span of time), a reinforcement threshold (an integer number) and an age-off threshold (another span of time). The time partition length determines the time windows in which observations are binned together as a single instance of evidence. The reinforcement threshold specifies in how many partitions of time a piece of observation evidence must appear prior to attribution to an entity. The age-off threshold determines when an assignment is removed and a piece of evidence is no longer considered as reinforcing evidence.

In some embodiments, the system maintains an entity datastore of network attribute pair mappings to entities and a datastore of observations of evidence supporting new attribute mappings to entities. The system processes the wireless observation dataset over a time period equal to the time partition length. Within this time partition in the network observation dataset, the system scans each network observation event to determine if any two fields in the event match a pair of network attributes present within the entity datastore. If a network observation record contains a network attribute pair present within the entity datastore, and the third field is not present within the entity datastore, it is added as a single observation of evidence for the mapping of that attribute to the given entity with an age-off time of the current time partition plus the length of the age-off threshold.

For example, if the BSSID a2e4d20fb96b and FirstBank-Wifi are attributed to Entity 1 and a wireless network observation event containing these two attributes and an IP address of 192.0.2.125 is observed within the 4 hour partition of 2018-09-24 00:00:00-03:59:50, a single instance of evidence of the attribution of 192.0.2.125 to Entity 1 would be recorded. If an age-off threshold of 24 hours is used, and 192.0.2.125 is not observed again, this piece of evidence will be removed from the system at 2018-09-25 04:00:00. If another wireless network observation record with the same attributes is observed between 2018-09-24 00:00:00-03:59:50, it will not increment the evidence observation count because it falls into the same time partition. However, if the observation falls between 2018-09-24 03:59:50 and 2018-09-25 03:59:50, the evidence observation count will increment and the age-off time will be extended to 24 hours from the time partition in which the second record was observed. If the reinforcement threshold is 2, the 192.0.2.125 would be mapped to Entity 1. If the reinforcement threshold is 3, it would not be mapped until it is observed again within the age-off threshold, or not at all if it is not observed prior to the age-off threshold. After updating any relevant evidence observations within a given partition of time, the system ages-off any evidence for which the age-off time has expired, removing the evidence from consideration for attribute mapping.

When the network observation data is available, in some embodiments the entity-asset association system repeats this process of discovering new evidence, incrementing evidence observations, mapping network attributes to entities with evidence exceeding the reinforcement threshold, and aging off expiring evidence across the next partition of time. Such a system satisfies four desirable functions for assigning network attributes to entities: 1) it discovers new network attributes for assignment to entities, improving entity coverage, 2) it reduces the likelihood of the assignment of anomalous our outlying events to entities by enforcing a reinforcement threshold, 3) it facilitates a time-bounded method of event deduplication when unique device identifiers are unavailable, 4) it gracefully handles the removal of network attribute assignments that are no longer active or valid.

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

A computing system used to implement various embodiments may include general-purpose computers, vector-based processors, graphics processing units (GPUs), network appliances, mobile devices, or other electronic systems capable of receiving network data and performing computations. A computing system in general includes one or more processors, one or more memory modules, one or more storage devices, and one or more input/output devices that may be interconnected, for example, using a system bus. The processors are capable of processing instructions stored in a memory module and/or a storage device for execution thereof. The processor can be a single-threaded or a multi-threaded processor. The memory modules may include volatile and/or non-volatile memory units.

The storage device(s) are capable of providing mass storage for the computing system, and may include a non-transitory computer-readable medium, a hard disk device, an optical disk device, a solid-date drive, a flash drive, or some other large capacity storage devices. For example, the storage device may store long-term data (e.g., one or more data sets or databases, file system data, etc.). The storage device may be implemented in a distributed way over a network, such as a server farm or a set of widely distributed servers, or may be implemented in a single computing device.

The input/output device(s) facilitate input/output operations for the computing system and may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices. In some examples, mobile computing devices, mobile communication devices, and other devices may be used as computing devices.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium.

Various embodiments and functional operations and processes described herein may be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting. The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items. Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for identifying networking assets of an entity, the method comprising the steps of:
   accessing a dataset of network observations that comprise network access information derived from a plurality of devices, wherein the dataset comprises a plurality of tuples, each tuple comprising a service set identifier (SSID) identifying a network accessed by a device and a network observation parameter;
   evaluating from each tuple the corresponding SSID using a specified entity name;
   identifying one or more SSIDs that match with the specified entity name;
   filtering the one or more SSIDs according to the network observation parameter; and
   designating the filtered SSIDs as networking assets of the entity.

2. The method of claim 1, wherein the evaluating step with respect to a particular SSID comprises:
   transforming the specified entity name into a plurality of distinct sub strings; and
   comparing each substring with that particular SSID.

3. The method of claim 1, wherein:
   the evaluating step with respect to a particular SSID comprises scoring the particular SSID based on a degree of match between that particular SSID and the specified entity name; and
   the step of identifying the one or more SSIDs comprises selecting SSIDs having a score at least equal to a specified threshold.

4. The method of claim 1, wherein:
   in each tuple, a respective network observation parameter comprises a respective location of a device accessing a network indicated by the corresponding SSID; and
   the filtering step comprises removing from the identified one or more SSIDs, an SSID wherein a location of a device accessing a network indicated by that SSID does not match with any location of the entity.

5. The method of claim 1, wherein in each tuple, a respective network observation parameter comprises a respective location of a device accessing a network indicated by the corresponding SSID, the method further comprising:
   designating locations of the devices included in the tuples corresponding to the designated SSIDs as locations of the entity.

6. The method of claim 1, wherein:
   in each tuple, a respective network observation parameter comprises a respective network address of a device accessing a network indicated by the corresponding SSID; and
   the filtering step comprises removing from the identified one or more SSIDs, an SSID wherein a network address of a device accessing a network indicated by that SSID does not match with any network address belonging to the entity.

7. The method of claim 1, wherein in each tuple, a respective network observation parameter comprises a respective network address of a device accessing a network indicated by the corresponding SSID, the method further comprising:
   designating the network addresses of the devices included in the tuples corresponding to the designated SSIDs as network addresses of the entity.

8. The method of claim 1, wherein each tuple comprises a timestamp indicating time at which network access by the corresponding device was observed, the method further comprising:
   dividing a specified time window into a specified number of time partitions;
   identifying all tuples comprising a particular SSID;
   identifying all time partitions corresponding to the respective timestamps included in the identified tuples;
   determining that a total number of the identified partitions is less than a specified observation-count threshold; and
   discarding, prior to the evaluating, selecting, or designating steps, the identified tuples.

9. A method for identifying networking assets of an entity, the method comprising the steps of:
   accessing a dataset of network access information derived from a plurality of devices, wherein the dataset comprises a plurality of tuples, each tuple comprising: (a) a location of a device, and (b)(i) a service set identifier (SSID) representing a network accessed by the device, or (ii) a basic service set identifier (BSSID) corresponding to an access point of the network accessed by the device, or (iii) a network address designated to the device;

selecting one or more tuples wherein the location of the one or more devices associated with the one or more tuples matches with a location of a specified entity; and designating: (i) the SSIDs in the tuple, or (ii) the BSSIDs in the tuple, or (iii) the network addresses in the tuple as networking assets of the entity.

10. The method of claim 9, further comprising:
translating the location of a device from a tuple into a latitude-longitude location representation; or
translating the location of the specified entity into a latitude-longitude location representation.

11. The method of claim 10, further comprising:
when a respective horizontal positioning error (HPE) value associated with a respective device location in a set of tuples is greater than a location-error threshold, omitting from the dataset the set of tuples, prior to the selecting step.

12. The method of claim 10, wherein determining that the location of the device matches with the location of the specified entity comprises evaluating a continuous distance metric or a discrete distance metric.

13. The method of claim 12, wherein the continuous distance metric or the discrete distance metric corresponds to a size of premise of the entity.

14. A method for identifying networking assets of an entity, the method comprising the steps of:
obtaining a dataset comprising network access information derived from a plurality of devices, wherein the dataset comprises a plurality of tuples, each tuple comprising: (a) a network address designated to a device, and (b)(i) a service set identifier (SSID) representing a network accessed by the device, or (ii) a basic service set identifier (BSSID) corresponding to an access point of the network accessed by the device;
selecting one or more tuples wherein the network address designated to the one or more respective devices associated with the one or more tuples matches with a set of network addresses associated with a specified entity; and
designating: (i) the SSIDs in the tuple, or (ii) the BSSIDs in the tuple as networking assets of the entity.

15. The method of claim 14, wherein:
each tuple comprises a location of the device; and
the designating step comprises determining that the location of the device in the tuple matches with a location of the specified entity.

16. The method of claim 14, wherein each tuple comprises a location of the device, the method further comprising:
designating the location of the device as a location of the entity.

17. A system for identifying networking assets of an entity, comprising:
a processor;
a network port in communication with the processor and adapted to receive or access a dataset of network observations that comprise network access information derived from a plurality of devices, wherein the dataset comprises a plurality of tuples, each tuple comprising a service set identifier (SSID) identifying a network accessed by a device and a network observation parameter; and
a memory coupled to the processor and comprising instructions, which when executed by the processor, program the processor to:
evaluate from each tuple the corresponding SSID using a specified entity name;
identify one or more SSIDs that match with the specified entity name;
filter the one or more SSIDs according to the network observation parameter; and
designate the filtered SSIDs as networking assets of the entity.

18. The system of claim 17, wherein to evaluating a particular SSID the instructions program the processor to:
transform the specified entity name into a plurality of distinct sub strings; and
compare each substring with that particular SSID.

19. The system of claim 17, wherein:
to evaluate a particular SSID the instructions program the processor to score the particular SSID based on a degree of match between that particular SSID and the specified entity name; and
to identify the one or more SSIDs the instructions program the processor to select SSIDs having a score at least equal to a specified threshold.

20. The system of claim 17, wherein:
in each tuple, a respective network observation parameter comprises a respective location of a device accessing a network indicated by the corresponding SSID; and
to perform the filtering operation, the instructions program the processor to remove from the identified one or more SSIDs, an SSID wherein a location of a device accessing a network indicated by that SSID does not match with any location of the entity.

21. The system of claim 17,
wherein in each tuple, a respective network observation parameter comprises a respective location of a device accessing a network indicated by the corresponding SSID; and
the instructions program the processor to designate locations of the devices included in the tuples corresponding to the designated SSIDs as locations of the entity.

22. The system of claim 17, wherein:
in each tuple, a respective network observation parameter comprises a respective network address of a device accessing a network indicated by the corresponding SSID; and
to perform the filtering operation, the instructions program the processor to remove from the identified one or more SSIDs, an SSID wherein a network address of a device accessing a network indicated by that SSID does not match with any network address belonging to the entity.

23. The system of claim 17, wherein:
in each tuple, a respective network observation parameter comprises a respective network address of a device accessing a network indicated by the corresponding SSID; and
the instructions program the processor to designate the network addresses of the devices included in the tuples corresponding to the designated SSIDs as network addresses of the entity.

24. The system of claim 17, wherein:
each tuple comprises a timestamp indicating time at which network access by the corresponding device was observed; and
the instructions program the processor to:
  divide a specified time window into a specified number of time partitions;
  identify all tuples comprising a particular SSID;
  identify all time partitions corresponding to the respective timestamps included in the identified tuples;
  determine that a total number of the identified partitions is less than a specified observation-count threshold; and
  discard, prior to the evaluating, selecting, or designating steps, the identified tuples.

* * * * *